US012513860B2

(12) United States Patent
Lee et al.

(10) Patent No.: US 12,513,860 B2
(45) Date of Patent: Dec. 30, 2025

(54) CLEANER WITH HEAT DISSIPATION STRUCTURE

(71) Applicant: SAMSUNG ELECTRONICS CO., LTD., Suwon-si (KR)

(72) Inventors: Seongu Lee, Suwon-si (KR); Hyunwoo Kim, Suwon-si (KR); Mijeong Song, Suwon-si (KR); Ahyoung Lee, Suwon-si (KR); Yeongju Lee, Suwon-si (KR); Jaeshik Jeong, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 202 days.

(21) Appl. No.: 18/471,298

(22) Filed: Sep. 21, 2023

(65) Prior Publication Data

US 2024/0206130 A1 Jun. 20, 2024

Related U.S. Application Data

(63) Continuation of application No. PCT/KR2023/012849, filed on Aug. 30, 2023.

(30) Foreign Application Priority Data

Dec. 15, 2022 (KR) .................. 10-2022-0176034
Mar. 23, 2023 (KR) .................. 10-2023-0038111

(51) Int. Cl.
*H05K 7/20* (2006.01)
*A47L 9/28* (2006.01)

(52) U.S. Cl.
CPC ........ *H05K 7/20509* (2013.01); *A47L 9/2884* (2013.01)

(58) Field of Classification Search
CPC .................. H05K 7/20509; A47L 9/2884
See application file for complete search history.

(56) References Cited

U.S. PATENT DOCUMENTS

| 7,002,080 B2 | 2/2006 | Tani et al. |
| 8,759,686 B2 | 6/2014 | Cheng |

(Continued)

FOREIGN PATENT DOCUMENTS

| CN | 101656463 A | 2/2010 |
| CN | 208510932 U | 2/2019 |

(Continued)

OTHER PUBLICATIONS

International Search Report mailed Nov. 29, 2023 for PCT/KR2023/012849. In conformance with MPEP 609—Concise explanation of the relevance includes issue date of foreign OA and references cited therein.

(Continued)

*Primary Examiner* — Mukundbhai G Patel
(74) *Attorney, Agent, or Firm* — CANTOR COLBURN LLP

(57) ABSTRACT

A cleaner includes a battery which is detachable from a main body, a printed circuit board (PCB) provided in the main body, a first connector provided on the PCB and including a first terminal portion, a second connector provided in the battery and including a second terminal portion coupled to the first terminal portion when the battery is mounted onto a battery mounting portion, and a heat dissipation structure provided on the PCB and configured to dissipate heat from the first terminal portion. The heat dissipation structure including a heat dissipation pad provided on the PCB and a plurality of heat dissipation patterns arranged two-dimensionally on the heat dissipation pad.

20 Claims, 19 Drawing Sheets

(56) References Cited

U.S. PATENT DOCUMENTS

| | | | |
|---|---|---|---|
| 10,297,878 B2 | 5/2019 | Stickney et al. | |
| 11,076,736 B2* | 8/2021 | Hwang | A47L 9/2857 |
| 11,426,039 B2 | 8/2022 | Nam et al. | |
| 2006/0214641 A1 | 9/2006 | Cho | |
| 2015/0155606 A1 | 6/2015 | Stickney et al. | |
| 2022/0115881 A1 | 4/2022 | Yamanaka et al. | |
| 2022/0271624 A1* | 8/2022 | Wang | H02K 11/0094 |

FOREIGN PATENT DOCUMENTS

| | | | |
|---|---|---|---|
| CN | 214804419 U | 11/2021 | |
| JP | S6080421 A | 5/1985 | |
| JP | 2006095210 A | 4/2006 | |
| JP | 4119205 B2 | 7/2008 | |
| JP | 2015526835 A | 9/2015 | |
| JP | 6202788 B2 | 9/2017 | |
| JP | 2021003261 A | 1/2021 | |
| JP | 2022071790 A | 5/2022 | |
| JP | 2022173494 A | 11/2022 | |
| KR | 100482409 B1 | 4/2005 | |
| KR | 20060102851 A | 9/2006 | |
| KR | 20080018745 A | 2/2008 | |
| KR | 101345101 B1 | 12/2013 | |
| KR | 101400305 B1 | 5/2014 | |
| KR | 20170022871 A | 3/2017 | |
| KR | 20220116694 A | 8/2022 | |
| KR | 20220133839 A | 10/2022 | |

OTHER PUBLICATIONS

The extended European search report for EP Application No. 23903669.2 mailed on Oct. 29, 2025, citing the above reference(s).

\* cited by examiner

CLEANER WITH HEAT DISSIPATION STRUCTURE

BACKGROUND

1. Field

The disclosure relates to a cleaner.

2. Description of the Related Art

A cleaner, such as a vacuum cleaner, uses negative pressure to suck in air containing foreign substances, such as dust, and separates the foreign substances from the sucked-in air and receives the foreign substances in a dust collection container. A cordless cleaner may include a battery. The battery may be detachable from the cordless cleaner. In a cordless cleaner, a battery connector may be provided on the battery, and a body-side connector may be provided on the cordless cleaner. When the battery is mounted onto the cordless cleaner, the battery connector is coupled to the body-side connector. The cordless cleaner may receive power from the battery through the battery connector and the body-side connector to perform a cleaning operation.

SUMMARY

An embodiment of a cleaner body includes a board accommodating portion and a battery mounting portion. A printed circuit board (PCB) is disposed in the board accommodating portion. A first connector is provided on the PCB. The first connector includes a first terminal portion. The first terminal portion of the first connector is exposed to the outside through the battery mounting portion. The battery may be mounted onto/removed from the battery mounting portion. A second connector including a second terminal portion is provided on the battery. The first terminal portion is coupled to the second terminal portion when the battery is mounted onto the battery mounting portion. A heat dissipation structure configured to dissipate heat from the first terminal portion is provided on the PCB. The heat dissipation structure includes a heat dissipation pad and a plurality of heat dissipation patterns. The plurality of heat dissipation patterns are arranged two-dimensionally on the heat dissipation pad.

DETAILED DESCRIPTION

Figure 1:
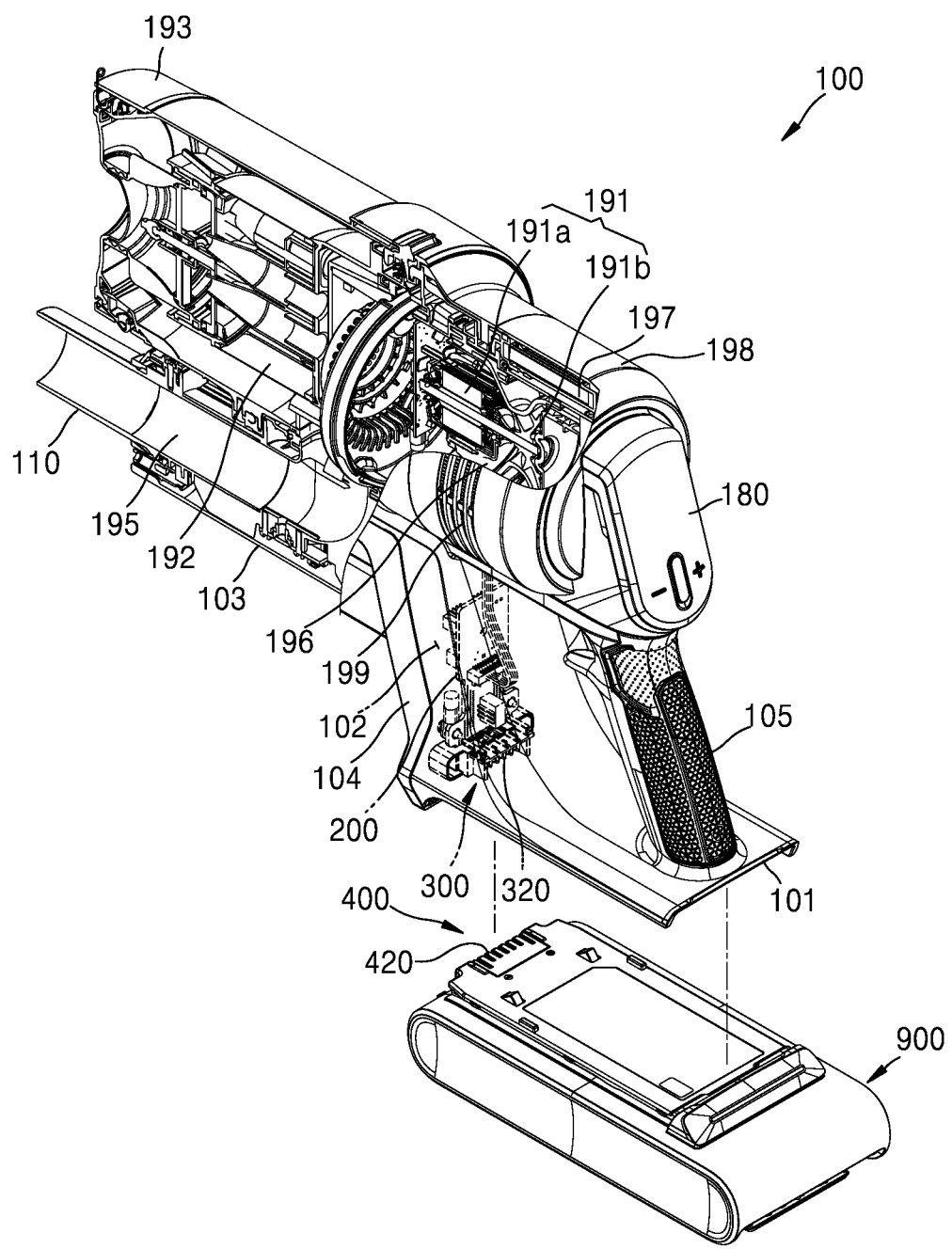
FIG. 1 is a schematic partial cross-sectional perspective view of a cleaner according to an embodiment of the disclosure.

Throughout the disclosure, the expression "at least one of a, b or c" or "at least one selected from a, b and c" indicates only a, only b, only c, both a and b, both a and c, both b and c, all of a, b, and c, or variations thereof.

It should be understood that various embodiments of the disclosure in this document and terms used therein are not intended to limit the technical features described herein to particular embodiments of the disclosure and that the disclosure includes various modifications, equivalents, or substitutions of the embodiments of the disclosure.

With regard to the description of the drawings, like reference numerals may be used to represent like or related elements.

A singular form of a noun corresponding to an item may include one or a plurality of the items unless the context clearly indicates otherwise.

As used herein, each of the phrases such as "A or B," "at least one of A and B," "at least one of A or B," "A, B, or C," "at least one of A, B, and C," and "at least one of A, B, or C" may include any one of the items listed together in a corresponding one of the phrases, or all possible combinations thereof.

The term "and/or" includes any combination of a plurality of associated elements listed, or any one of the plurality of associated listed elements.

Terms such as "first," "second," etc. may be used simply to distinguish an element from other elements and do not limit the elements in any other respect (e.g., importance or order).

It will be understood that when an element (e.g., a first element) is referred to, with or without the term "functionally" or "communicatively", as being "coupled" or "connected" to another element (e.g., a second element), the element may be coupled to the other element directly (e.g., in a wired manner), wirelessly, or via a third element.

The terms such as "comprise," "include," or "have" are intended to specify the presence of stated features, numbers, steps, operations, elements, components, or combinations thereof, but do not preclude the presence or addition of one or more other features, numbers, steps, operations, elements, components, or combinations thereof.

It will also be understood that when an element is referred to as "connected," "coupled," "supported," or "in contact" with another element, this includes not only when the elements are directly connected, coupled, supported, or in contact, but also when they are indirectly connected, coupled, supported, or in contact via a third element.

It will also be understood that when an element is referred to as being "on" another element, the element may be directly on the other element, or intervening elements may also be present therebetween.

Hereinafter, embodiments of the disclosure will be described in detail with reference to the accompanying drawings. In the drawings, like reference numerals or symbols refer to like components or elements performing substantially the same functions.

A cleaner, e.g., a vacuum cleaner, sucks in air and foreign substances, such as dust, with a suction force generated by a suction motor, filters out the foreign substances, and collects the foreign substances in a dust collection container. A cordless cleaner receives power from a battery to perform a cleaning operation. The battery is detachable from the cordless cleaner. When the battery is mounted onto the cordless cleaner, power from the battery is supplied to the cordless cleaner via a connector-to-connector connection structure In the connector-to-connector connection structure, a body-side terminal portion provided on the main body of the cleaner and a battery-side terminal portion provided on the battery electrically contact each other to supply power from the battery to the main body, and heat may be generated in the body-side terminal portion due to contact resistance. The heat generated in the terminal portion may affect the performance and lifespan of the cleaner.

Figure 2:
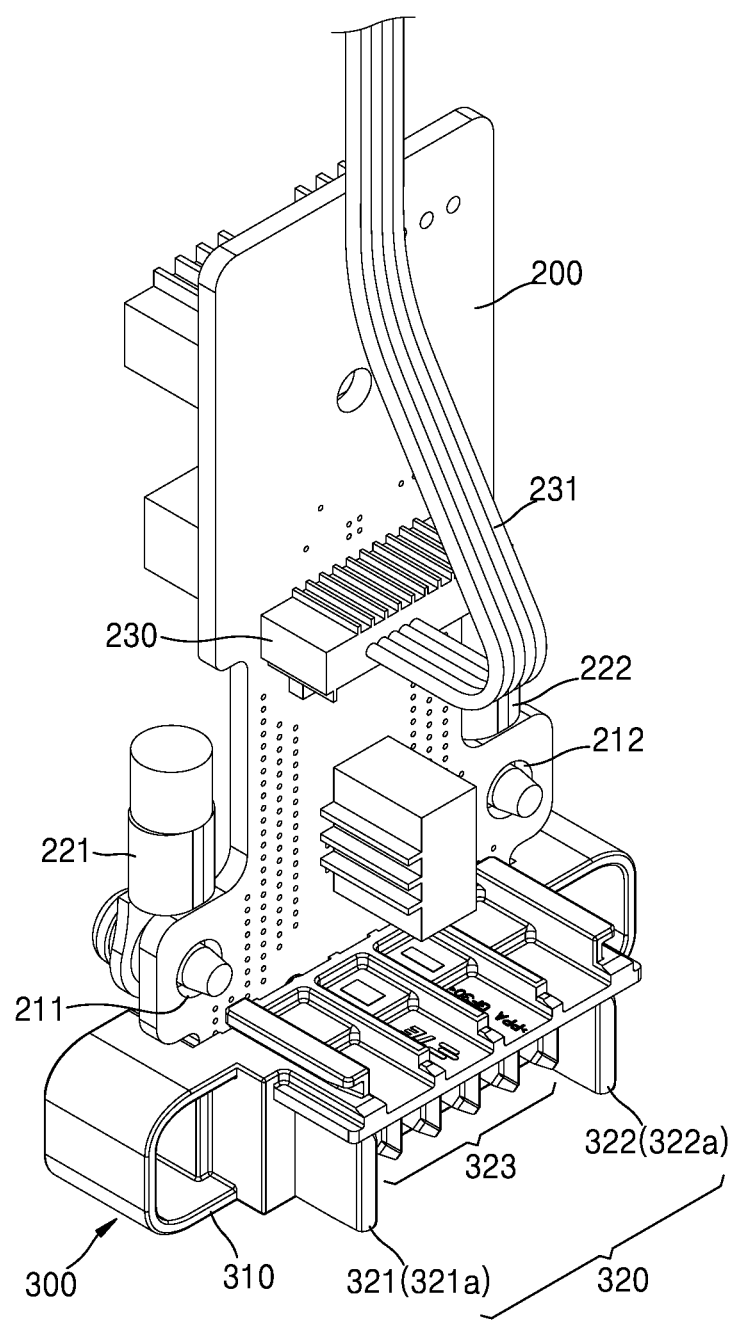
FIG. 2 is a schematic perspective view of a printed circuit board (PCB) according to an embodiment of the disclosure.
Figure 3:
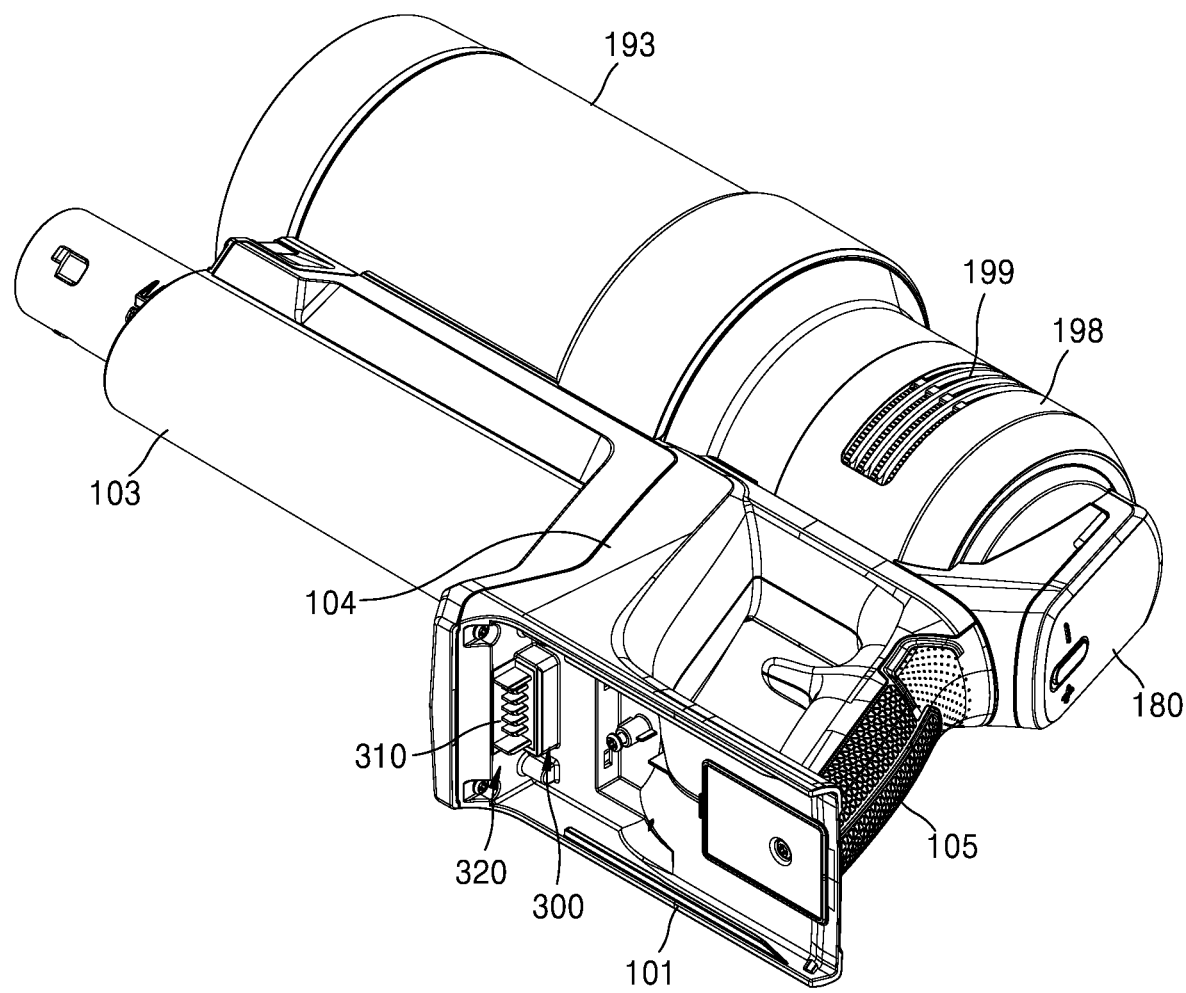
FIG. 3 is a schematic partial perspective view of a cleaner from which a battery is removed, according to an embodiment of the disclosure.
Figure 4:
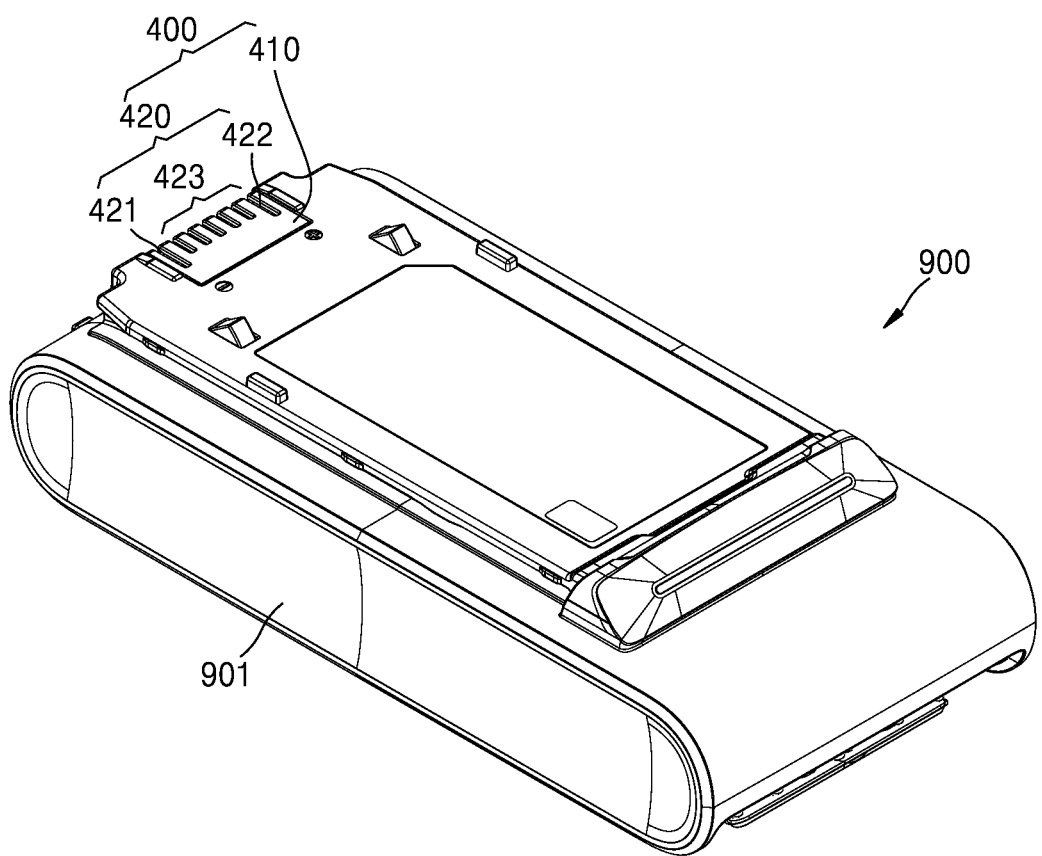
FIG. 4 is a schematic perspective view of a battery according to an embodiment of the disclosure.
Figure 5:
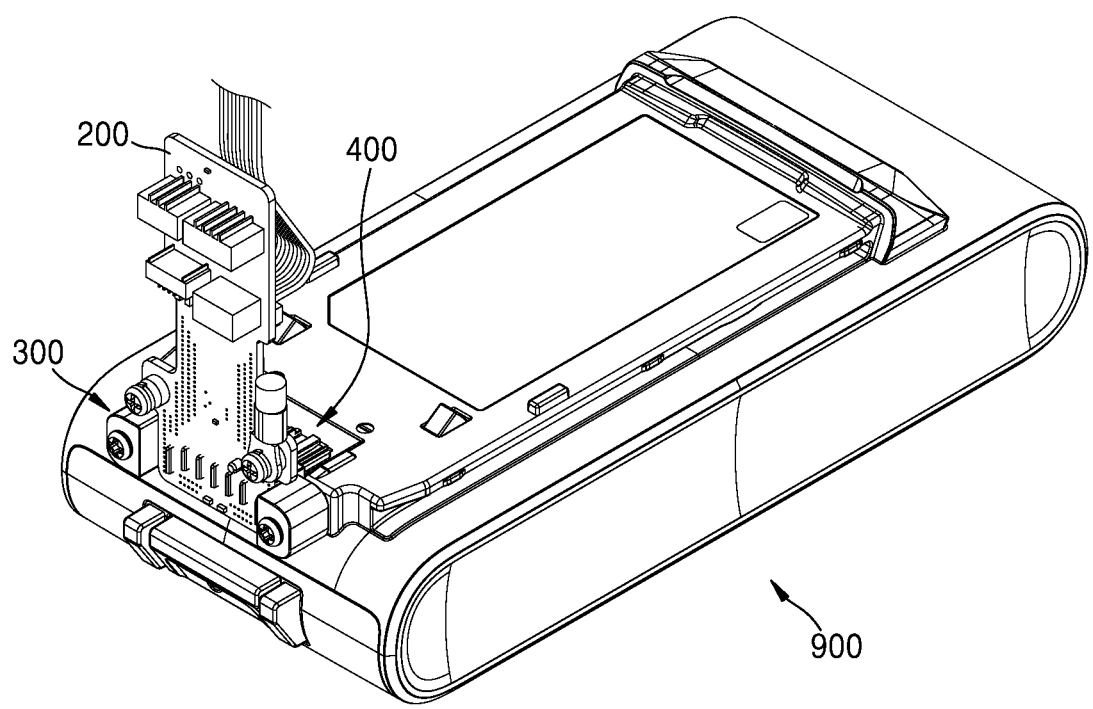
FIG. 5 shows an embodiment in a state in which a first connector is coupled to a second connector when a battery is mounted onto a main body.

Embodiments of the cleaner according to the disclosure has a heat dissipation structure capable of reducing or dissipating heat generated in a terminal portion electrically connecting a main body to a battery. FIG. 1 is a schematic partial cross-sectional perspective view of a cleaner according to an embodiment of the disclosure. The cleaner illustrated in FIG. 1 is a stick-type cordless cleaner. Although not shown in the drawings, an embodiment of the cleaner may be any of various types of cleaner using a battery, such as a handheld cleaner, a robot cleaner, etc. FIG. 2 is a schematic perspective view of a printed circuit board (PCB) 200 according to an embodiment of the disclosure. FIG. 3 is a schematic partial perspective view of a cleaner from which a battery 900 is removed, according to an embodiment of the disclosure. FIG. 4 is a schematic perspective view of the battery 900 according to an embodiment of the disclosure. FIG. 5 shows an embodiment in a state in which a first connector 300 is coupled to a second connector 400 when the battery 900 is mounted onto a main body 100.

Referring to FIGS. 1 to 5, an embodiment of the cleaner includes the main body 100 and the battery 900. The battery 900 may be mounted onto/removed from the main body 100. The main body 100 may include a board accommodating portion 102 and a battery mounting portion 101. A PCB 200 is disposed or placed in the board accommodating portion 102. The board accommodating portion 102 is provided in an internal space of the main body 100. The first connector 300 is provided on the PCB 200. The first connector 300 includes a first terminal portion 320. The first connector 300 is provided on the PCB 200 such that the first terminal portion 320 is exposed to the outside through the battery mounting portion 101. The battery 900 may be mounted/removed to/from the battery mounting portion 101. The second connector 400 is provided in the battery 900. The second connector 400 includes a second terminal portion 420. When the battery 900 is mounted onto the battery mounting portion 101, the second connector 400 is coupled to the first connector 300. The second terminal portion 420 is coupled to the first terminal portion 320. Accordingly, the battery 900 is electrically connected to the main body 100. Power from the battery 900 may be supplied to the main body 100, and control signals may be communicated between the battery 900 and the main body 100. A heat dissipation structure (500 of FIG. 6) for dissipating heat away from the first terminal portion 320 is provided on the PCB 200. The heat dissipation structure 500 may include a heat dissipation pad (520 of FIG. 6) and a plurality of heat dissipation patterns (510 of FIG. 6) arranged two-dimensionally on a heat dissipation pad 520.

The main body 100 may include an extension tube mounting portion 110 where an extension tube (not shown) is mounted. A suction nozzle (not shown) is detachably connected to one end of the extension tube. The other end of the extension tube may be detachably connected to the extension tube mounting portion 110 in the main body 100. The extension tube connects the main body 100 and the suction nozzle to form a passage through which air and foreign substances sucked in via the suction nozzle move to the main body 100.

The main body 100 may include a suction fan 191 that generates a suction force used to suck in air and foreign substances on a surface to be cleaned, a dust collector 192 that separates the foreign substances from the sucked-in air, and a dust collection container 193 in which the separated foreign substances are received. The suction fan 191 may include a suction motor 191a and an impeller 191b mounted on a rotating shaft of the suction motor 191a. When the suction motor 191a is driven to rotate the impeller 191b, suction pressure is generated to suck in the air and foreign substances on the surface to be cleaned through an intake passage 195. The dust collection container 193 may be detachable from the main body 100. The dust collection container 193 may be separated from the main body 100, and the foreign substances collected in the dust collection container 193 may be removed. The dust collector 192 may have, for example, a cyclone dust collecting structure. Based on a flow path of the sucked-in air, the dust collector 192 may be positioned between the dust collection container 193 and the suction fan 191. The main body 100 is provided with the intake passage 195 connecting the extension tube mounting portion 110 and the dust collector 192. The foreign substances and air sucked in through the suction nozzle due to the suction force generated by the suction fan 191 pass through the extension tube, the extension tube mounting portion 110, and the intake passage 195 to the dust collector 192. The foreign substances are separated by the dust collector 192 and received in the dust collection container 193.

The main body 100 may include an exhaust passage 196 for discharging the air from which the foreign substances are filtered out. The exhaust passage 196 is provided at a downstream side of the suction fan 191. A filter 197 may be provided at an inlet of the exhaust passage 196, in the middle of the exhaust passage 196e, or an outlet of the exhaust passage 196. In an embodiment of the disclosure, the filter 197 is provided at the outlet of the exhaust passage 196.

There is no particular limitation on the type of filter 197. In an embodiment, the filter 197 may include, for example, a high efficiency particulate air (HEPA) filter. The filter 197 may filter out ultrafine dust and the like that are not filtered out by the dust collector 192. The filter 197 may be accommodated in a filter housing 198. The filter housing 198 may be detachable from the main body 100. The filter housing 198 may be removed from the main body 100, and the filter 197 accommodated in the filter housing 198 may be replaced with a new filter. Alternatively, the filter 197 accommodated in the filter housing 198 may be washed. The air from which the foreign substances are filtered out may be discharged to the outside after passing through the exhaust passage 196 and the filter 197. The filter housing 198 may include an exhaust port 199 through which the air passing through the exhaust passage 196 and the filter 197 is discharged.

The main body 100 may include a controller 180. The controller 180 may include a control circuit and a manipulating portion for manipulation input such as power on/off, suction strength adjustment, and operation mode. The controller 180 may further include an indicating portion for displaying information about an operating state of the cleaner, etc. The manipulating portion may include a physical button, a resistive or capacitive touch panel, etc. The manipulating portion may have a structure that allows manipulation input via voice recognition, communication with an external control device, etc. The indicating portion may audibly and visually display an operating state of the cleaner. For example, the indicating portion may include a beeper, a display, one or more light emitters, etc. By employing a touch panel display, a manipulating portion and an indicating portion may be integrated. The control circuit may control the cleaner according to input manipulation via the manipulating portion and control the indicating portion to display information about an operating state of the cleaner, etc.

In an embodiment, for example, the main body 100 may include a base portion 103 extending in a longitudinal direction, a battery mounting portion 101 extending in the longitudinal direction parallel to the base portion 103, and a support portion 104 connecting the base portion 103 and the battery mounting portion 101. The base portion 103 may extend in the longitudinal direction rearwardly beyond the support portion 104. The dust collection container 193, the dust collector 192, the suction fan 191, and the filter housing 198 may be installed on top of the base portion 103. The extension tube mounting portion 110 may be provided at a front of the base portion 103. The intake passage 195 is provided inside the base portion 103 and extends from the extension tube mounting portion 110 to the dust collector 192. The exhaust passage 196 may be provided between the suction fan 191 and the filter 197 and on top of the base portion 103. The support portion 104 may connect a front end of the battery mounting portion 101 to the base portion 103. In an embodiment, the board accommodating portion 102 is provided inside the support portion 104. In such an embodiment, the board accommodating portion 102 may be an inner space of the support portion 104. In an embodiment, for example, the support portion 104 may be inclined toward a front from a lower end to an upper end. The main body 100 may be provided with a handle 105 for enabling a user to carry and operate the cleaner. The handle 105 may be located at the rear of the support portion 104. In an embodiment, for example, the handle 105 may be formed to connect a rear end of the battery mounting portion 101 to a rear end of the base portion 103. The handle 105 may be inclined toward the front from a lower end to an upper end for ease of use. For example, the upper end of the handle 105 may form an obtuse angle with the base portion 103, and the lower end of the handle 105 may form an acute angle with the battery mounting portion 101. The handle 105 may have a size large enough for the user to comfortably hold it in his or her hand. The controller 180 may be located near the rear end of the base portion 103 and on top of the handle 105.

Referring to FIGS. 1 and 2, in an embodiment, a PCB 200 is located in a board accommodating portion 102. The PCB 200 may be a single-sided PCB, a double-sided PCB, or a multilayer PCB. The first connector 300 is provided on the PCB 200. The first connector 300 may include a first connector housing 310 and the first terminal portion 320 supported on the first connector housing 310. For example, the first terminal portion 320 may penetrate the PCB 200 in a thickness direction and be electrically connected to printed circuit patterns provided on the PCB 200 by soldering.

The PCB 200 may have a structure for transferring power between the battery 900 and the main body 100. For example, the first terminal portion 320 may include first power terminals 321 and 322. The first power terminal 321 may be a plus terminal, and the first power terminal 322 may be a ground terminal. The first power terminals 321 and 322 may be terminals for supplying power to components consuming power of the cleaner. The components that consume power may include, for example, a suction motor 191*a*. The PCB 200 may include power connection portions 211 and 212 for supplying power to components in the main body 100, which consume power. The power connection portions 211 and 212 are electrically connected to the first power terminals 321 and 322, respectively. Power supply lines 221 and 222 may be respectively connected to the power connection portions 211 and 212. The power supply lines 221 and 222 electrically connect components consuming power to the power connection portions 211 and 212.

The PCB 200 may further have a structure for transmitting control signals between the battery 900 and the main body 100. For example, the first terminal portion 320 may further include first control signal terminals 323. The first control signal terminals 323 each transmit a control signal between the battery 900 and the controller 180 of the main body 100. A control signal tap 230 may be further provided on the PCB 200. The control signal tap 230 may be electrically connected to the first control signal terminals 323. The control signal tap 230 may be electrically connected to various sensors (not shown) in the main body 100. The control signal tap 230 is connected to the controller 180, for example, a control circuit of the controller 180, via wires 231.

The first control signal terminals 323 may be located between the first power terminals 321 and 322. In an embodiment, the first power terminals 321 and 322 may be larger than the first control signal terminals 323 to lower the contact resistance with the second power terminals (421 and 422 of FIG. 4) of the second connector 400 as described below and to secure a large heat dissipation area. At least one of a width or a height of the first power terminals 321 and 322 may be greater than that of the first control signal terminals 323.

Referring to FIGS. 2 and 3, the first connector 300 is provided at one end (201 of FIG. 6) of the PCB 200, for example, near an end close to the battery mounting portion 101. The first connector 300 is exposed to the outside via the battery mounting portion 101. As shown in FIG. 3, a portion of the first connector housing 310 and the first terminal portion 320 are exposed to the outside.

Referring to FIG. 4, in an embodiment, the battery 900 includes a battery housing 901. A plurality of battery cells (not shown) and a battery management system (BMS) circuit board (not shown) are accommodated in the battery housing 901. The second connector 400 may be provided on the BMS circuit board and exposed outside of the battery housing 901. For example, the second connector 400 may be exposed at a front upper end of the battery housing 901. The second connector 400 may include a second connector housing 410, and a second terminal portion 420 supported on the second connector housing 410. The second terminal portion 420 may include second power terminals 421 and 422. The second terminal portion 420 may further include second control signal terminals 423. The second power terminals 421 and 422 and the second control signal terminals 423 are arranged at positions corresponding to those of the first power terminals 321 and 322 and the first control signal terminals 323 of the first connector 300.

In FIG. 5, the main body 100 is not shown for convenience of illustration. Referring to FIGS. 2, 4, and 5, when the battery 900 is mounted onto the battery mounting portion 101 of the main body 100, the first connector 300 and the second connector 400 are coupled to each other. The first terminal portion 320 and the second terminal portion 420 are coupled and electrically connected to each other. The first terminal portion 320 may match with the second terminal portion 420. The first power terminals 321 and 322 are respectively coupled to the second power terminals 421 and 422. Accordingly, power from the battery 900 may be transferred to the PCB 200. Power from the battery 900 may be transferred to the main body 100, such as components that consume power, via the second power terminals 421 and 422, the first power terminals 321 and 322, the power connection portions 211 and 212 of the PCB 200, and the power supply lines 221 and 222.

The first control signal terminals 323 are coupled to the second control signal terminals 423. Accordingly, control signals from the battery 900 may be transmitted to the PCB 200. The battery 900 may exchange control signals with the controller 180 via the second control signal terminals 423, the first control signal terminals 323, the control signal tap 230 on the PCB 200, and the wires 231.

As the cleaner is used, heat may be generated in a power system from the battery 900 to the main body 100, e. g., the suction motor 191a. For example, heat may be generated at the first terminal portion 320 of the first connector 300 and the second terminal portion 420 of the second connector 400. A large amount of heat is generated at the first power terminals 321 and 322 of the first terminal portion 320 where power is transmitted from the battery 900 to the main body 100. Heat generated in the first terminal portion 320 may be transferred to the inside of the battery 900 via the second terminal portion 420 and negatively affect power efficiency of the battery 900. In addition, heat generated in the power system including the first terminal portion 320 may negatively affect the performance and lifespan of the cleaner. When a temperature of the first power terminals 321 and 322 of the first connector 300 increases, the first power terminals 321 and 322 may cause deformation of their adjacent components constituting the cleaner and the appearance of the main body 100, a change in color of housing components forming the appearance of the main body 100, etc. The disclosure provides a heat dissipation structure capable of dissipating heat generated in a power system including the first terminal portion 320. The disclosure provides a heat dissipation structure capable of suppressing an increase in the temperature of the first power terminals 321 and 322 by dissipating heat away from the first power terminals 321 and 322.

Figure 6:
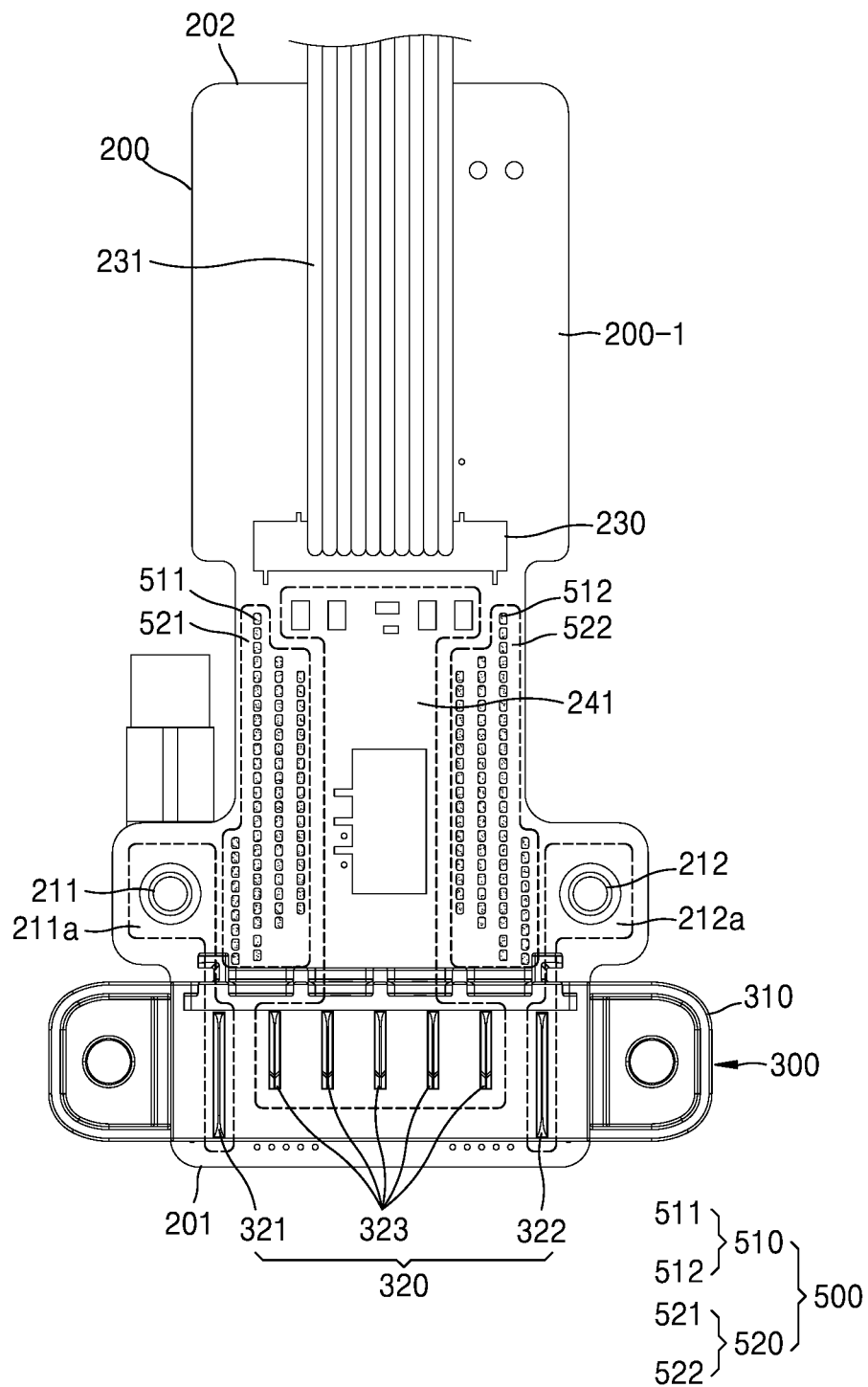
FIG. 6 is a schematic plan view of a PCB to which a heat dissipation structure is applied, according to an embodiment of the disclosure.

In an embodiment of the disclosure, the heat dissipation structure may be provided on the PCB 200. FIG. 6 is a schematic plan view of the PCB 200 to which a heat dissipation structure according to an embodiment of the disclosure is applied. Referring to FIG. 6, a heat dissipation structure 500 is provided on the PCB 200. The heat dissipation structure 500 is provided on a surface of the PCB 200. The heat dissipation structure 500 may include the heat dissipation pad 520 and the plurality of heat dissipation patterns 510 arranged two-dimensionally on the heat dissipation pad 520. The plurality of heat dissipation patterns 510 may be formed on a region of the surface of the PCB 200, other than a region 241 where a control signal pattern is formed. For example, the control signal pattern may include a pattern that electrically connects the first control signal terminals 323 to the control signal tap 230. The control signal pattern may include a pattern that electrically connects the control signal tap 230 or another control signal tap or taps on the PCB 200 to a sensor inside the main body 100. In an embodiment of the disclosure, the heat dissipation structure 500 is provided on a first side 200-1 of the PCB 200. In such an embodiment of the disclosure, the plurality of heat dissipation patterns 510 may be arranged two-dimensionally in a region between the first power terminals 321 and 322 and the control signal tap 230. In an alternative embodiment of the disclosure, the plurality of heat dissipation patterns 510 may be formed beyond the control signal tap 230 to a region extending to an end 202 of the PCB 200 opposite to the end 201 where the first connector 300 is located. This will be described below with reference to FIG. 9.

The heat dissipation pad 520 may be provided on a region of the first side 200-1 of the PCB 200, other than the region 241 where the control signal pattern is formed. The heat dissipation pad 520 may include or be formed of a metal having electrical conductivity and thermal conductivity, such as copper (Cu), gold (Au), silver (Ag), tin (Sn), etc. In an embodiment of the disclosure, the heat dissipation pad 520 is provided on a region between the first power terminals 321 and 322 and the control signal tap 230. The heat dissipation pad may also be referred to as a solder pad. The plurality of heat dissipation patterns 510 are arranged two-dimensionally on the heat dissipation pad 520. The plurality of heat dissipation patterns 510 are formed to protrude (or defined by portions protruding) from the first side 200-1 of the PCB 200. For example, the heat dissipation patterns 510 may be solder patterns. In an alternative embodiment, the heat dissipation pad 520 may be formed beyond the control signal tap 230 to near the end 202 opposite to the end 201 of the PCB 200 where the first connector 300 is located. This will be described below with reference to FIG. 9.

The heat dissipation pad 520 may include a first heat dissipation pad 521 and a second heat dissipation pad 522. The first heat dissipation pad 521 may extend from a region adjacent to the first power terminal 321 of the PCB 200 toward the end 202 of the PCB 200, e.g., to the vicinity of the control signal tap 230. The first heat dissipation pad 522 may extend from a region adjacent to the first power terminal 322 of the PCB 200 toward the end 202 of the PCB 200, e.g., to the vicinity of the control signal tap 230. The region 241 where the control signal pattern is formed may be positioned between the first and second heat dissipation pads 521 and 522. The plurality of heat dissipation patterns 510 include a plurality of first heat dissipation patterns 511 and a plurality of second heat dissipation patterns 512 respectively arranged two-dimensionally on the first heat dissipation pad 521 and the second heat dissipation pad 522.

Figure 7:
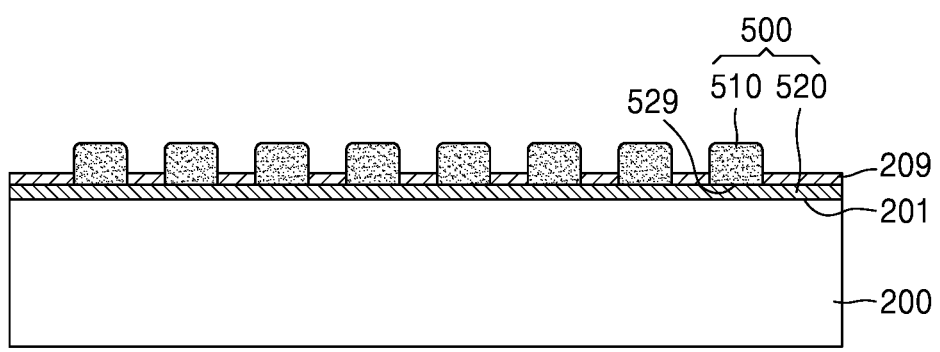
FIG. 7 is a schematic cross-sectional view showing a heat dissipation structure according to an embodiment of the disclosure.

FIG. 7 is a schematic cross-sectional view showing the heat dissipation structure 500 according to an embodiment of the disclosure. Referring to FIG. 7, the heat dissipation pad 520 is provided on one surface of the PCB 200. A region of the surface of the heat dissipation pad 520, other than regions where the plurality of heat dissipation patterns 510 are to be formed, is covered by a cover layer 209. The cover layer 209 may be, for example, an insulating layer. The cover layer 209 functions as a mask layer defining the regions where the heat dissipation patterns 510 are to be formed. A plurality of exposed regions 529 arranged two-dimensionally on the surface of the heat dissipation pad 520 are defined by the cover layer 209. The plurality of heat dissipation patterns 510 are formed by forming, for example, solder patterns respectively on the plurality of exposed regions 529. As a result, the heat dissipation structure 500 including the heat dissipation pad 520 and the plurality of heat dissipation patterns 510 arranged two-dimensionally on the heat dissipation pad 520 may be formed.

Heat generation in a power system occurs mainly in the first terminal portion 320 where a large amount of current flows, e. g., the first power terminals 321 and 322 and their surroundings. The inside of the support portion 104 is an idle space. The PCB 200 may be disposed or placed in the board accommodating portion 102 that is inside the support portion 104, and a surface area of the PCB 200 may be utilized as a surface area for heat dissipation. The size of the PCB 200 may be increased to a size large enough to accommodate the PCB 200 in the board accommodating portion 102. By forming the heat dissipation structure 500 with a high thermal conductivity on the PCB 200, heat may be transferred to a wide area of the PCB 200, and by dissipating the heat to an inside of the board accommodating portion 102 through the heat dissipation structure 500, an increase in temperature of the power system including the first power terminals 321 and 322 may be suppressed. Because the convex heat dissipation pattern 510 is formed on the heat dissipation pad 520, top and side surfaces of the heat dissipation pattern 510 become an effective heat dissipation surface area that is in contact with the air inside the board accommodating portion 102. Therefore, the heat dissipation surface area may be effectively increased, and the heat dissipation efficiency may be improved. By forming the heat dissipation patterns 510 as solder patterns, the heat dissipation structure 500 may be formed during a manufacturing process of the PCB 200.

Referring back to FIG. 6, the power connection portions 211 and 212 may be respectively located adjacent to the first power terminals 321 and 322. The power connection portions 211 and 212 are respectively connected to the first power terminals 321 and 322 via power patterns 211*a* and 212*a*. The power patterns 211*a* and 212*a* respectively form current paths from the first power terminal 321 to the power connection portion 211 and from the first power terminal 322 to the power connection portion 212. The first and second heat dissipation pads 521 and 522 are respectively separate from the first power terminals 321 and 322. The first and second heat dissipation pads 521 and 522 are respectively separate from the power patterns 211*a* and 212*a*. In such an embodiment, the first and second heat dissipation pads 521 and 522 are respectively separate from the current paths from the first power terminal 321 to the power connection portion 211 and from the first power terminal 322 to the power connection portion 212.

Figure 8:
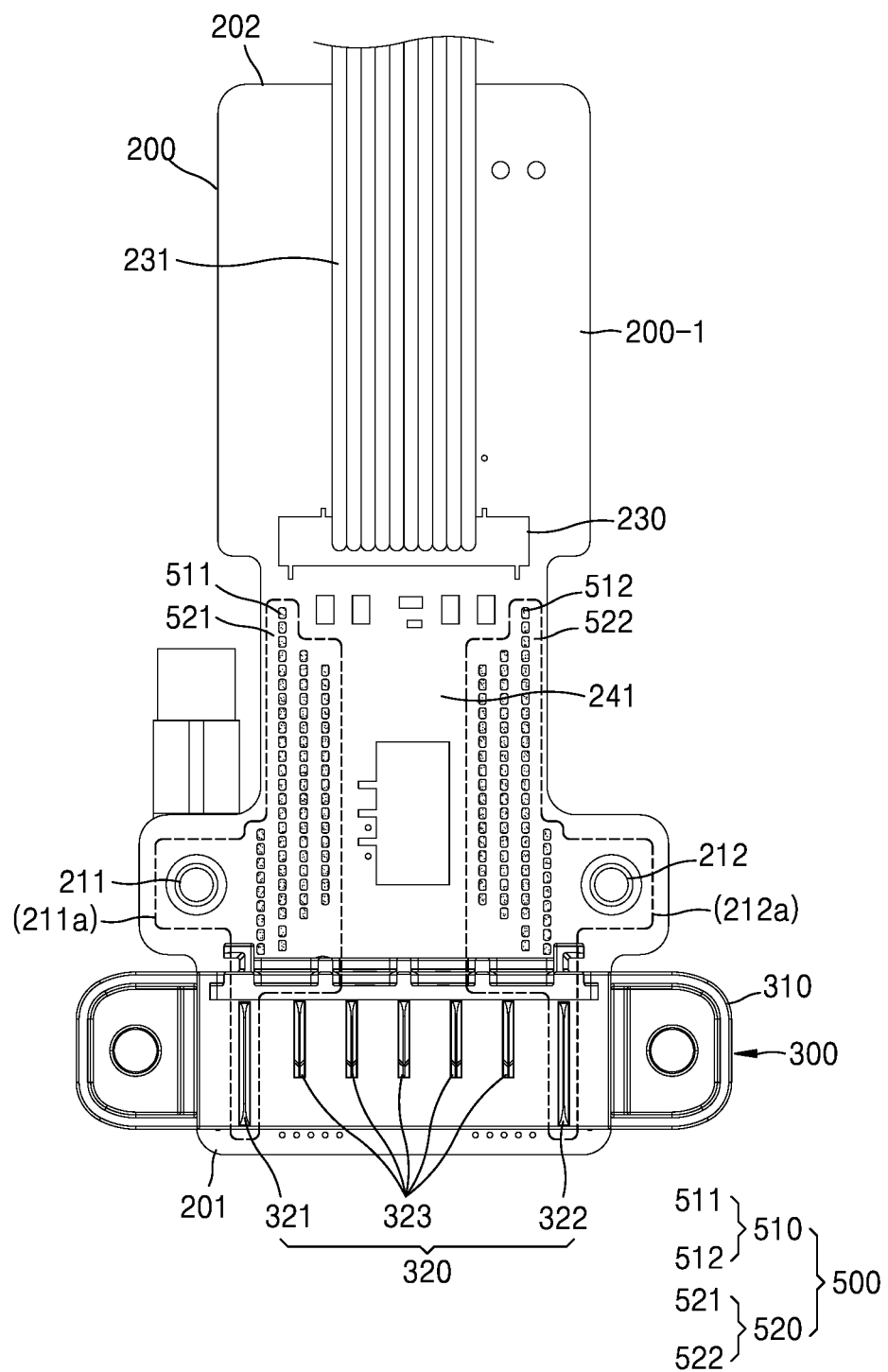
FIG. 8 is a schematic plan view showing a heat dissipation structure according to an embodiment of the disclosure.

FIG. 8 is a schematic plan view showing a heat dissipation structure according to an embodiment of the disclosure. The embodiment of the heat dissipation structure 500 of FIG. 8 is substantially the same as the embodiment of the heat dissipation structure 500 of FIG. 10 except that the first and second heat dissipation pads 521 and 522 are respectively connected to the first power terminals 321 and 322. In such an embodiment, heat from the first power terminals 321 and 322 may be effectively transferred to the heat dissipation structure 500 and dissipated through the heat dissipation structure 500. In such an embodiment, as shown in FIG. 8, the first and second heat dissipation pads 521 and 522 may be respectively integrated with the power patterns 211*a* and 212*a*. The first and second heat dissipation pads 521 and 522 are respectively connected to current paths from the first power terminal 321 to the power connection portion 211 and from the first power terminal 322 to the power connection portion 212. In such an embodiment, the power connection portions 211 and 212 may be respectively connected to the first power terminals 321 and 322 by the first and second heat dissipation pads 521 and 522. Thus, heat from the first power terminals 321 and 322, heat generated in the current paths between the first power terminals 321 and 322 and the power connection portions 211 and 212, and heat generated in the power supply lines 221 and 222 and the power connection portions 211 and 212 may be effectively transferred to the heat dissipation structure 500 and dissipated through the heat dissipation structure 500. Although not shown, the first and second heat dissipation pads 521 and 522 may be respectively connected to the first power terminals 321 and 322 but separate from the power patterns 211*a* and 212*a*.

Figure 9:
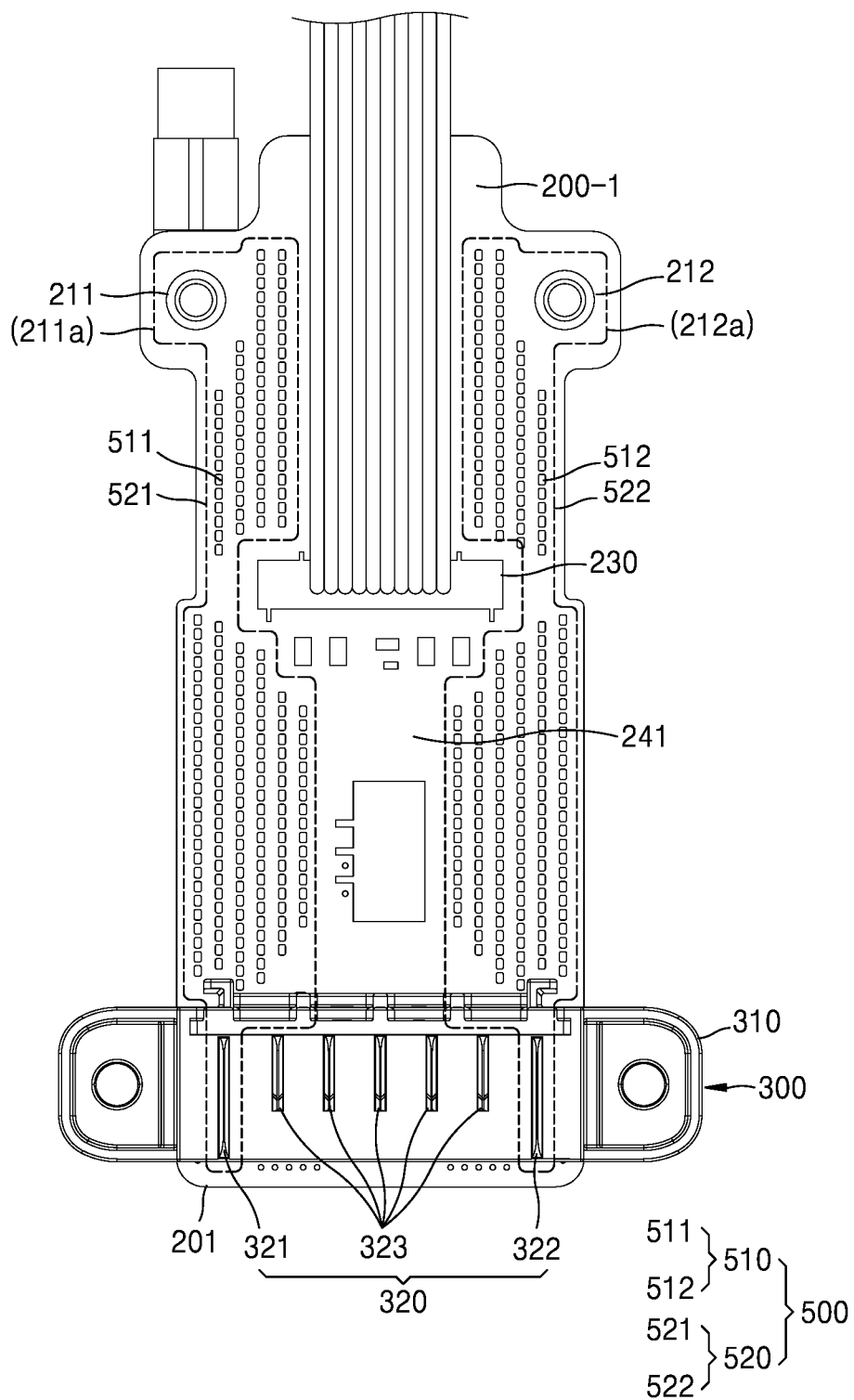
FIG. 9 is a schematic plan view showing a heat dissipation structure according to an embodiment of the disclosure.

FIG. 9 is a schematic plan view showing a heat dissipation structure according to an embodiment of the disclosure. The embodiment of heat dissipation structure 500 of FIG. 9 is substantially the same as the embodiment of the heat dissipation structures 500 of FIGS. 6 and 8 except that the power connection portions 211 and 212 are respectively located farther apart from the first power terminals 321 and 322. Referring to FIG. 9, the power connection portions 211 and 212 are positioned adjacent to the end 202 of PCB 200. In an embodiment, the power connection portions 211 and 212 are located farther apart from the first connector 300 than the control signal tap 230 is. The first and second heat dissipation pads 521 and 522 are respectively connected to the first power terminals 321 and 322 and respectively extend to the power connection portions 211 and 212. Accordingly, the first and second heat dissipation pads 521 and 522 respectively form current paths from the first power terminal 321 to the power connection portion 211 and from the first power terminal 322 to the power connection portion 212. As a result, a heat dissipation area of the heat dissipation structure 500 may be increased, thereby improving a heat dissipation effect. The heat from the first power terminals 321 and 322, heat generated in the current paths respectively connecting the first power terminals 321 and 322 to the power connection portions 211 and 212, and heat generated in the power supply lines 221 and 222 and the power connection portions 211 and 212 may be effectively transferred to the heat dissipation structure 500 and dissipated through the heat dissipation structure 500.

Figure 10:
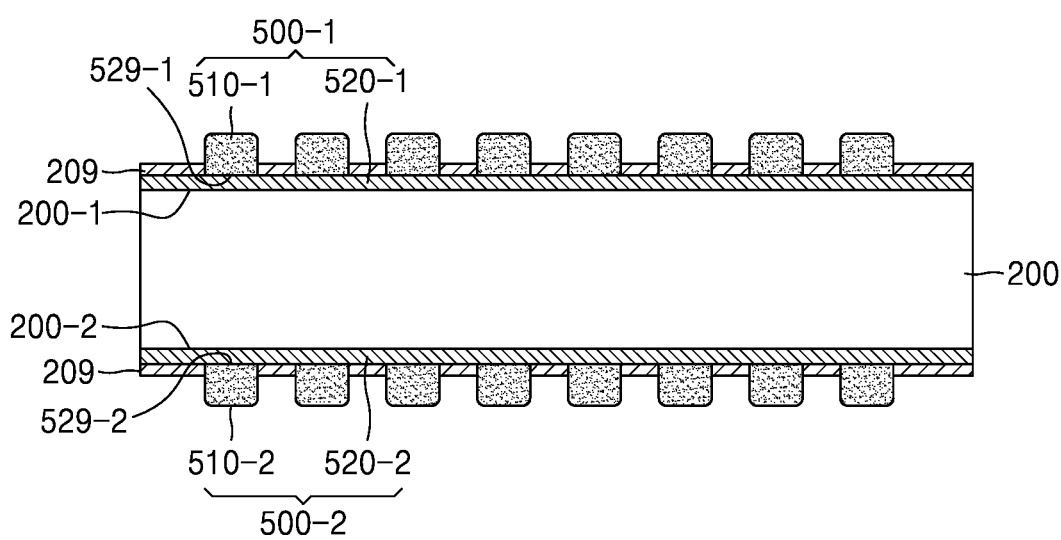
FIG. 10 is a schematic cross-sectional view showing a double-sided heat dissipation structure according to an embodiment of the disclosure.

In the above-described embodiments, the heat dissipation structure 500 is provided only on the first side 200-1 of the PCB 200. Alternatively, the heat dissipation structure 500 may be provided on two opposing sides of the PCB 200. FIG. 10 is a schematic cross-sectional view showing a double-sided heat dissipation structure according to an embodiment of the disclosure. Referring to FIG. 10, the PCB 200 may include the first side 200-1 and a second side 200-2 opposite to the first side 200-1. First and second heat dissipation structures 500-1 and 500-2 may be respectively provided on the first and second sides 200-1 and 200-2 of the PCB 200. The first and second heat dissipation structures 500-1 and 500-2 may be the same as the embodiments of the heat dissipation structure 500 described with reference to FIGS. 6 to 9.

In an embodiment, for example, the first heat dissipation structure 500-1 may include a first heat dissipation pad 520-1 provided on the first side 200-1 of the PCB 200 and a plurality of first heat dissipation patterns 510-1 arranged two-dimensionally on a surface of the first heat dissipation pad 520-1. A region of the surface of the first heat dissipation pad 520-1, other than regions where the plurality of first heat dissipation patterns 510-1 are to be formed, is covered by the cover layer 209, so that a plurality of exposed regions 529-1 arranged two-dimensionally are provided on the surface of the first heat dissipation pad 520-1. The first heat dissipation pattern 510-1 is arranged in each of the plurality of exposed regions 529-1. As a result, the first heat dissipation structure 500-1 including the plurality of heat dissipation patterns 510-1 arranged two-dimensionally may be formed. The second heat dissipation structure 500-2 may include a second heat dissipation pad 520-2 provided on the second side 200-2 of the PCB 200 and a plurality of second heat dissipation patterns 510-2 arranged two-dimensionally on a surface of the second heat dissipation pad 520-2. A region of the surface of the second heat dissipation pad 520-2, other than regions where the plurality of second heat dissipation patterns 510-2 are to be formed, is covered by the cover layer 209, so that a plurality of exposed regions 529-2 arranged two-dimensionally are provided on a surface of the second heat dissipation pad 520-2. The second heat dissipation pattern 510-2 is arranged in each of the plurality of exposed regions 529-2. As a result, the second heat dissipation structure 500-2 including the plurality of heat dissipation patterns 510-2 arranged two-dimensionally may be formed.

The area occupied by the first heat dissipation pad 520-1 of the first heat dissipation structure 500-1 and the number and arrangement of the plurality of first heat dissipation patterns 510-1 may be the same as or different from the area occupied of the second heat dissipation pad 520-2 of the second heat dissipation structure 500-2 and the number and arrangement of the plurality of second heat dissipation patterns 510-2. The first heat dissipation structure 500-1 and the second heat dissipation structure 500-2 may be formed in appropriate shapes and sizes by taking into account the arrangement of circuit elements respectively disposed on the first side 200-1 and the second side 200-2 of the PCB 200 and the range of the region 241 where the control signal pattern is formed. By respectively forming the first and second heat dissipation structures 500-1 and 500-2 on the two sides of the PCB 200, the heat dissipation area of the PCB 200 may be increased and the heat dissipation effect may be improved.

Each of the first and second heat dissipation pads 520-1 and 520-2 may be separated from the first power terminals 321 and 322, and may be connected to the first power terminals 321 and 322. Each of the first and second heat dissipation pads 520-1 and 520-2 may be separated from or connected to the current paths respectively connecting the first power terminals 321 and 322 to the power connection portions 211 and 212. In other words, each of the first and second heat dissipation pads 520-1 and 520-2 may be separated from the power patterns 211a and 211b, and may be integrated with the power patterns 211a and 211b.

Figure 11:
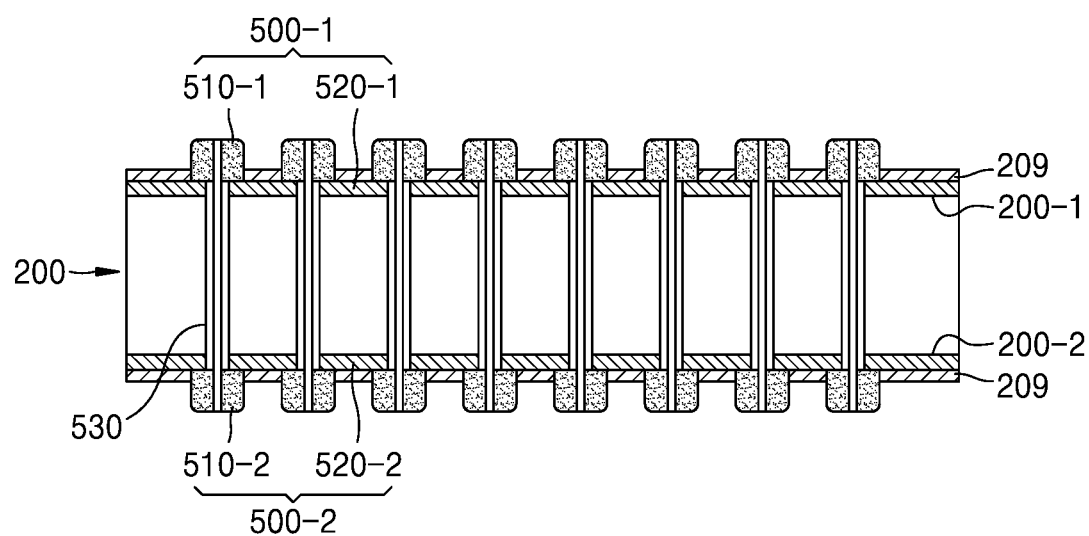
FIG. 11 is a schematic cross-sectional view showing a heat dissipation structure according to an embodiment of the disclosure.

FIG. 11 is a schematic cross-sectional view showing a heat dissipation structure according to an embodiment of the disclosure. The embodiment of the heat dissipation structure of FIG. 11 is substantially the same as the embodiment of the heat dissipation structure of FIG. 10 except that the first heat dissipation structure 500-1 and the second heat dissipation structure 500-2 are thermally connected to each other by a plurality of thermally conductive through-holes 530 defined or formed through the PCB 200. Referring to FIG. 11, the thermally conductive through-holes 530 may be defined through the PCB 200 in the thickness direction. The thermally conductive through-holes 530 may pass through to the first and second heat dissipation pads 520-1 and 520-2. An inner surface of each of the thermally conductive through-holes 530 may be coated with a thermally conductive material such as a metal. In such an embodiment, the entire inside of the thermally conductive through-hole 530 may be filled with a thermally conductive material such as a metal. The thermally conductive through-hole 530 may also be referred to as a thermal via, a via, a via hole, a through hole, or the like. The first and second heat dissipation pads 520-1 and 520-2 are thermally connected to each other through the thermally conductive through-holes 530, which facilitates heat transfer between the first and second heat dissipation pads 520-1 and 520-2. Therefore, heat from the power system, such as the first power terminals 321 and 322 of the first terminal portion 320, may be actively dissipated via two sides of the PCB 200, thereby improving the heat dissipation effect. The plurality of thermally conductive through-holes 530 may also thermally connect at least some of a plurality of first heat dissipation patterns 510-1 to a plurality of second heat dissipation patterns 510-2 corresponding thereto in the thickness direction of the PCB 200. This may further improve the heat dissipation effect.

In an experiment, in the case of a PCB without a heat dissipation structure according to the related art, the temperature of the first power terminals 321 and 322 rises up to 91.4° C. during an operation of the cleaner. According to the experiment, in the case of a PCB according to an embodiment of the disclosure in which the first and second heat dissipation structures 500-1 and 500-2 and the thermally conductive through-holes 530 are applied, and each of the first and second heat dissipation pads 520-1 and 520-2 has a structure separate from the current paths respectively connecting the first power terminals 321 and 322 to the power connection portions 211 and 212, the temperature of the first power terminals 321 and 322 rises up to 46.1° C. According to the experiment, in the case of a PCB according to an embodiment of the disclosure in which the first and second heat dissipation structures 500-1 and 500-2 and the thermally conductive through-holes 530 are applied, and each of the first and second heat dissipation pads 520-1 and 520-2 has a structure connected to the current paths respectively connecting the first power terminals 321 and 322 to the power connection portions 211 and 212, the temperature of the first power terminals 321 and 322 rises up to 55.6° C. Based on the result of the experiment, it can be seen that the PCB with the first and second heat dissipation structures 500-1 and 500-2 and the thermally conductive through-holes 530 and the PCB with the first and second heat dissipation structures 500-1 and 500-2 exhibit a large heat dissipation effect.

Figure 12:
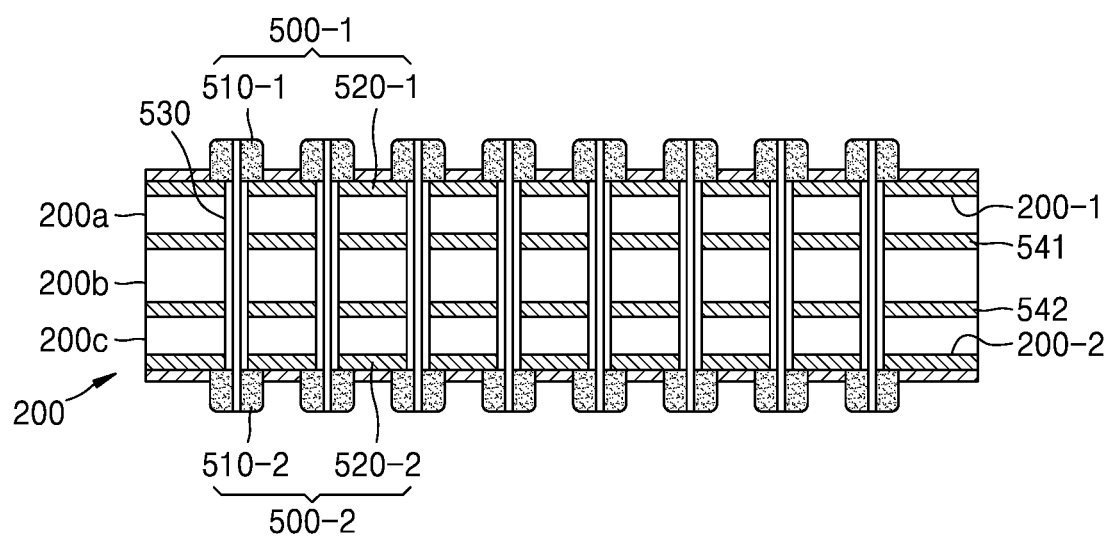
FIG. 12 is a schematic cross-sectional view showing a heat dissipation structure according to an embodiment of the disclosure.

FIG. 12 is a schematic cross-sectional view showing a heat dissipation structure according to an embodiment of the disclosure. The embodiment of the heat dissipation structure of FIG. 12 is substantially the same as the embodiment of the heat dissipation structure of FIG. 11 except that a multilayer PCB is used as the PCB 200. Referring to FIG. 12, the PCB 200 has a structure in which three substrate layers 200a, 200b, and 200c are stacked. The first heat dissipation structure 500-1 may be provided on a surface of the substrate layer 200a. The second heat dissipation structure 500-2 may be provided on a rear surface of the substrate layer 200c. In such an embodiment, the first heat dissipation pad 520-1 and the second heat dissipation pad 520-2 are surface heat dissipation pads respectively provided on surfaces of the PCB 200, i.e., the first side 200-1 and the second side 200-2. Interlayer heat dissipation pads 541 and 542 may be respectively provided on surfaces of the substrate layer 200b and the substrate layer 200c, respectively. No heat dissipation patterns are formed on the interlayer heat dissipation pads 541 and 542. The interlayer heat dissipation pads 541 and 542 are positioned between the first heat dissipation pad 520-1 and the second heat dissipation pad 520-2. The thermally conductive through-holes 530 may thermally (and electrically) connect at least two of the first and second heat dissipation pads 520-1 and 520-2 and the interlayer heat dissipation pads 541 and 542 to each other. By employing a multi-layer PCB, a heat conduction area may be expanded, which may improve a heat dissipation effect. Although FIG. 12 illustrates an embodiment of the PCB 200 having a three-layer structure, the number of layers in the PCB 200 is not limited thereto. Considering the amount of heat generated by the cleaner, a double-sided PCB (two-layer PCB) or a PCB with a multilayer structure composed of four or more layers may be used as the PCB 200.

In an embodiment of the disclosure, a method of increasing thermal conductivity of the first power terminals 321 and 322 of the first connector 300 may be used to suppress an increase in temperature of the first power terminals 321 and 322 of the first connector 300. As described above with reference to FIG. 2, the first connector 300 includes the first terminal portion 320. The first terminal portion 320 may include the first power terminals 321 and 322 and the first control signal terminals 323. The first power terminals 321 and 322 may include or be formed of a material having a high thermal conductivity. The first power terminals 321 and 322 may include or be formed of a material having a higher thermal conductivity than the first control signal terminals 323 through which a relatively small amount of current flows. In an embodiment of the disclosure, the first control signal terminals 323 may include or be formed of copper or a copper alloy, and the first power terminals 321 and 322 may include or be formed of a material, such as silver, having a higher thermal conductivity than copper or a copper alloy. In an embodiment of the disclosure, the first control signal terminals 323 may include or be formed of copper or a copper alloy, and the first power terminals 321 and 322 may be formed by plating a material having a high thermal conductivity, such as silver, on copper or a copper alloy. The thermal conductivity of copper is about 400 watts per meter kelvin (W/m·K). The thermal conductivity of silver is about 429 W/m·K which is about 7% higher than that of copper. Therefore, an increase in the temperature of the first power terminals 321 and 322 may be suppressed by increasing the heat dissipation performance of the first power terminals 321 and 322. Furthermore, because silver has a high electrical conductivity, contact resistance between the first power terminals 321 and 322 and the second power terminals 421 and 422 of the battery 900 may be reduced by using silver to form the first power terminals 321 and 322, thereby reducing heat generation.

As described above, the PCB 200 is disposed or placed inside the board accommodating portion 102 of the main body 100. In an embodiment, the board accommodating portion 102 may communicate with the outside to improve the heat dissipation effect of the PCB 200. For example, a passageway that allows outside air to enter the board accommodating portion 102 may be provided in the main body 100.

Figure 13:
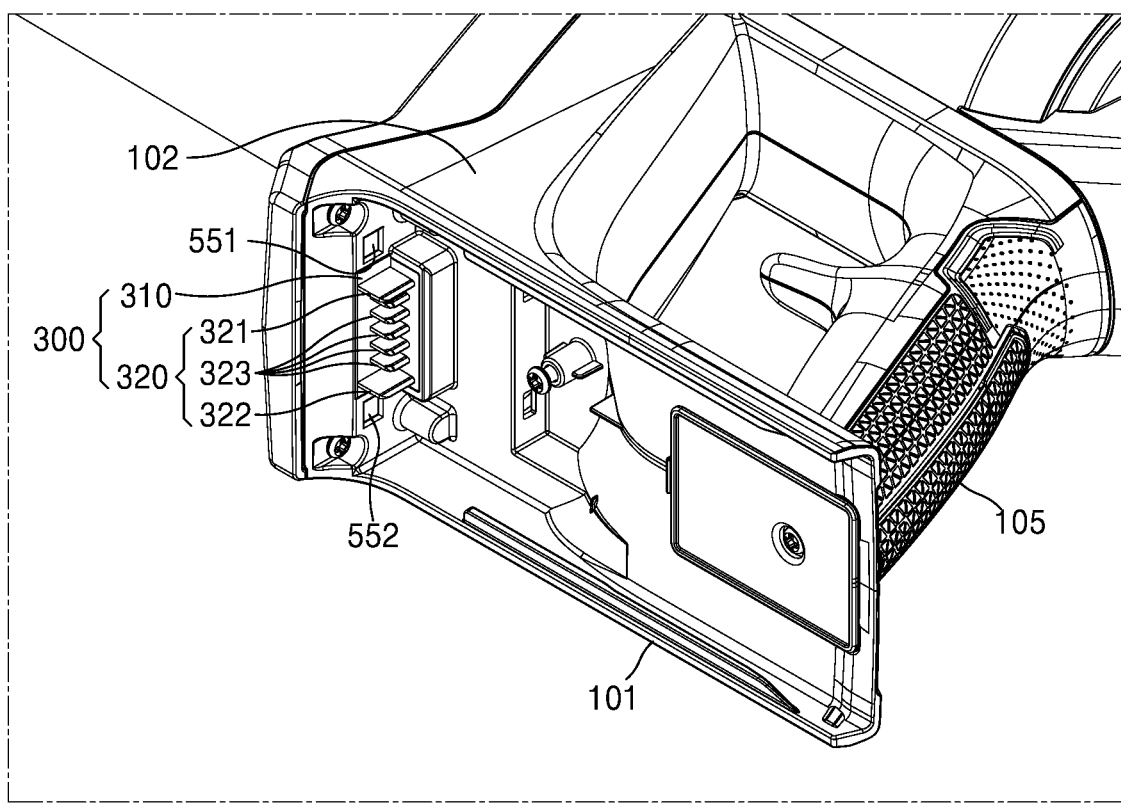
FIG. 13 is a schematic partial perspective view of a cleaner from which a battery is removed, according to an embodiment of the disclosure.

FIG. 13 is a schematic partial perspective view of a cleaner from which the battery 900 is removed, according to an embodiment of the disclosure. Referring to FIG. 13, as described above, in the first connector 300, a portion of the first connector housing 310 and the first terminal portion 320 are exposed to the outside through the battery mounting portion 101. The battery mounting portion 101 may be provided with air holes 551 and 552 via which the inside of the board accommodating portion 102 communicates with the outside. The air holes 551 and 552 may be provided at predetermined positions in the battery mounting portion 101 to allow the board accommodating portion 102 to communicate with the outside. In an embodiment, the positions of the air holes 551 and 552 may be variously determined. The air holes 551 and 552 may be provided at locations not exposed to the outside when the battery 900 is mounted onto the battery mounting portion 101. The above-described heat dissipation structures and structures for improving the heat dissipation effect may also be applied to the embodiment of the disclosure illustrated in FIG. 13.

In the PCB 200, a large amount of heat is generated in a region close to the first connector 300. Accordingly, in an embodiment, the air holes 551 and 552 may be located adjacent to the first connector 300 to allow outside air to be easily supplied to a region close to the first connector 300 on the PCB 200 or to allow heated air to easily escape to the outside. A large amount of heat is generated in the first power terminals 321 and 322. The air holes 551 and 552 may be respectively located adjacent to the first power terminals 321 and 322 to allow the outside air to be easily supplied to a region close to the first power terminals 321 and 322 or to allow air that has absorbed heat from the first power terminals 321 and 322 to easily escape to the outside. Because the inner space of the board accommodating portion 102 communicates with the outside air via the air holes 551 and 552, a heat dissipation effect achieved by the heat dissipation structure 500 may be improved. Although an embodiment provided with the two air holes 551 and 552 is shown in FIG. 13, alternatively, one or three or more air holes may be provided in the battery mounting portion 101 in consideration of a heat dissipation effect.

Figure 14:
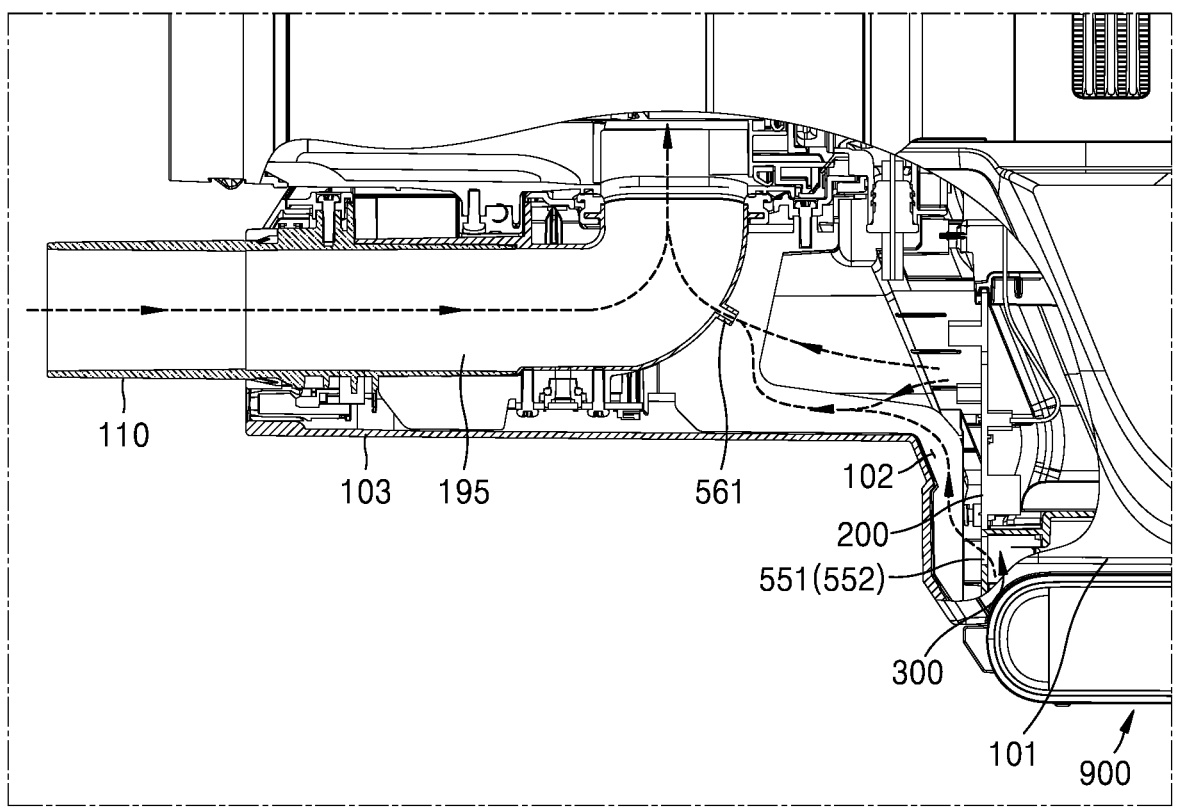
FIG. 14 is a schematic partial cross-sectional view of a cleaner according to an embodiment of the disclosure.

A method of supplying air to the board accommodating portion 102 may be considered. In an embodiment of the disclosure, outside air may be smoothly supplied into the board accommodating portion 102 via the air holes 551 and 552 by using suction pressure from the intake passage 195. FIG. 14 is a schematic partial cross-sectional view of a cleaner according to an embodiment of the disclosure. Referring to FIG. 14, a first communication port 561 is provided in the intake passage 195 through which outside air is drawn in. The first communication port 561 allows the intake passage 195 to communicate with the board communicating portion 102. The PCB 200 and the first connector 300 may be disposed or placed inside the board accommodating portion 102.

Suction pressure generated in the intake passage 195 by the suction fan 191 is exerted on the board accommodating portion 102. Outside air (hereinafter referred to as cooling air) is drawn into the board accommodating portion 102 through the air holes 551 and 552 by the suction pressure. The cooling air absorbs heat from the PCB 200 having the heat dissipation structure 500. The cooling air enters the intake passage 195 through the first communication port 561, is combined with the air sucked in via the extension tube, passes through the dust collector and the exhaust passage 196, and is discharged outside of the main body 100. According to an embodiment having this configuration, because outside air is smoothly supplied into the board accommodating portion 102 through the air holes 551 and 552 by the suction pressure generated by the suction fan 191, heat from the heat dissipation structure 500 of the PCB 200 and heat generated by the power system including the first terminal portion 320 may be effectively dissipated outside the main body 100. Because the cooling air exits the main body 100 after foreign substances are removed therefrom through the dust collector 192, a separate filter for filtering the cooling air may be omitted.

The above-described heat dissipation structures and structures for improving the heat dissipation effect may also be applied to the embodiment of the disclosure illustrated in FIG. 14.

Figure 15:
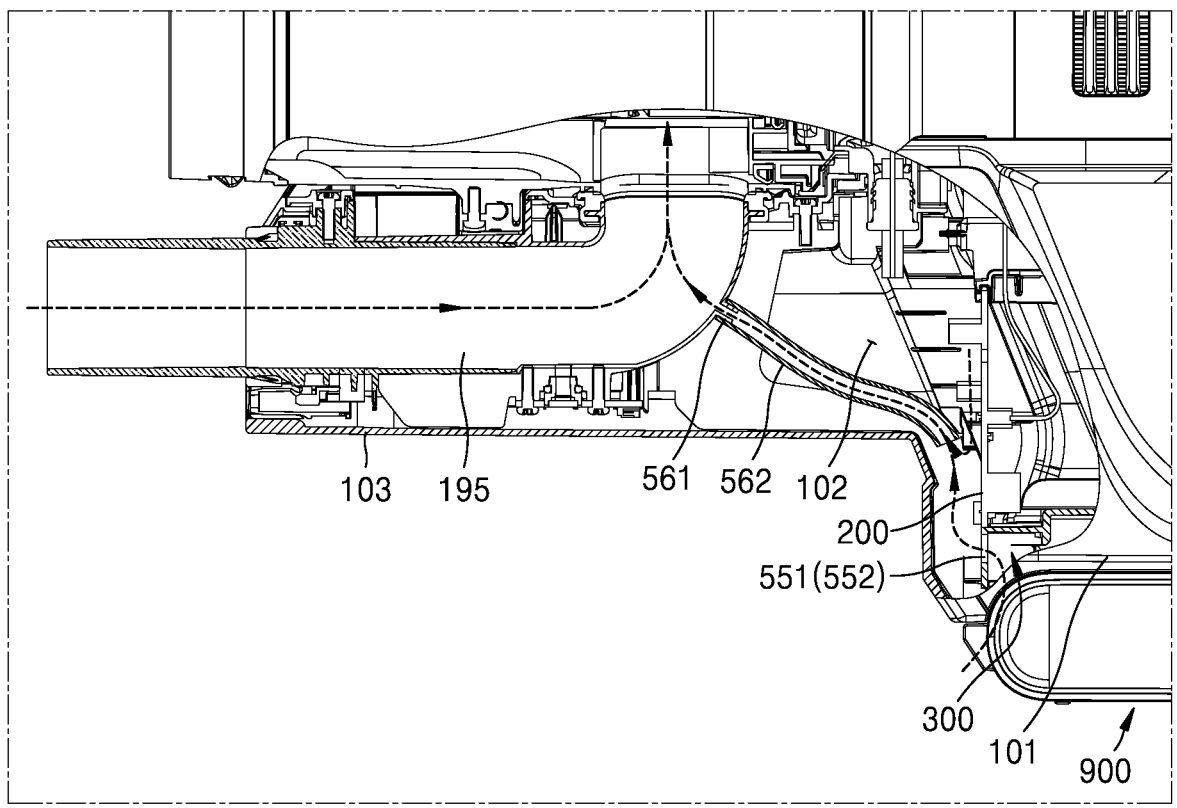
FIG. 15 is a schematic partial cross-sectional view of a cleaner according to an embodiment of the disclosure.

FIG. 15 is a schematic partial cross-sectional view of a cleaner according to an embodiment of the disclosure. The embodiment of the cleaner of FIG. 15 is substantially the same as the embodiment of the cleaner of FIG. 14 except that the cleaner further includes a first cooling passage 562. Referring to FIG. 15, the first communication port 561 via which the intake passage 195 communicates with the board accommodating portion 102 is provided in the intake passage 195 for drawing in outside air. The PCB 200 and the first connector 300 may be disposed or placed inside the board accommodating portion 102. The first cooling passage 562 applies a suction pressure created in the intake passage 195 in close proximity to the PCB 200. For example, the first cooling passage 562 has one end connected to the first communication port 561 and the other end extending toward the PCB 200. The other end of the first cooling passage 562 may extend to a location adjacent to the PCB 200. For example, the other end of the first cooling passage 562 may extend to a location adjacent to the heat dissipation structure 500. For example, the other end of the first cooling passage 562 may extend to a location adjacent to the first connector 300. Outside air (hereinafter referred to as cooling air) drawn into the board accommodating portion 102 via the air holes 551 and 552 is concentrated at the other end of the first cooling passage 562 near the PCB 200. An air flux near the PCB 200 may be increased, thereby improving a heat dissipation effect. The first cooling passage 562 may be implemented by a flexible tubular member such as a tube, a hose, or the like. The first cooling passage 562 may also be formed integrally with the main body 100 as a single unitary and indivisible part.

The above-described heat dissipation structures and structures for improving the heat dissipation effect may also be applied to the embodiment of the disclosure illustrated in FIG. 15.

Figure 16:
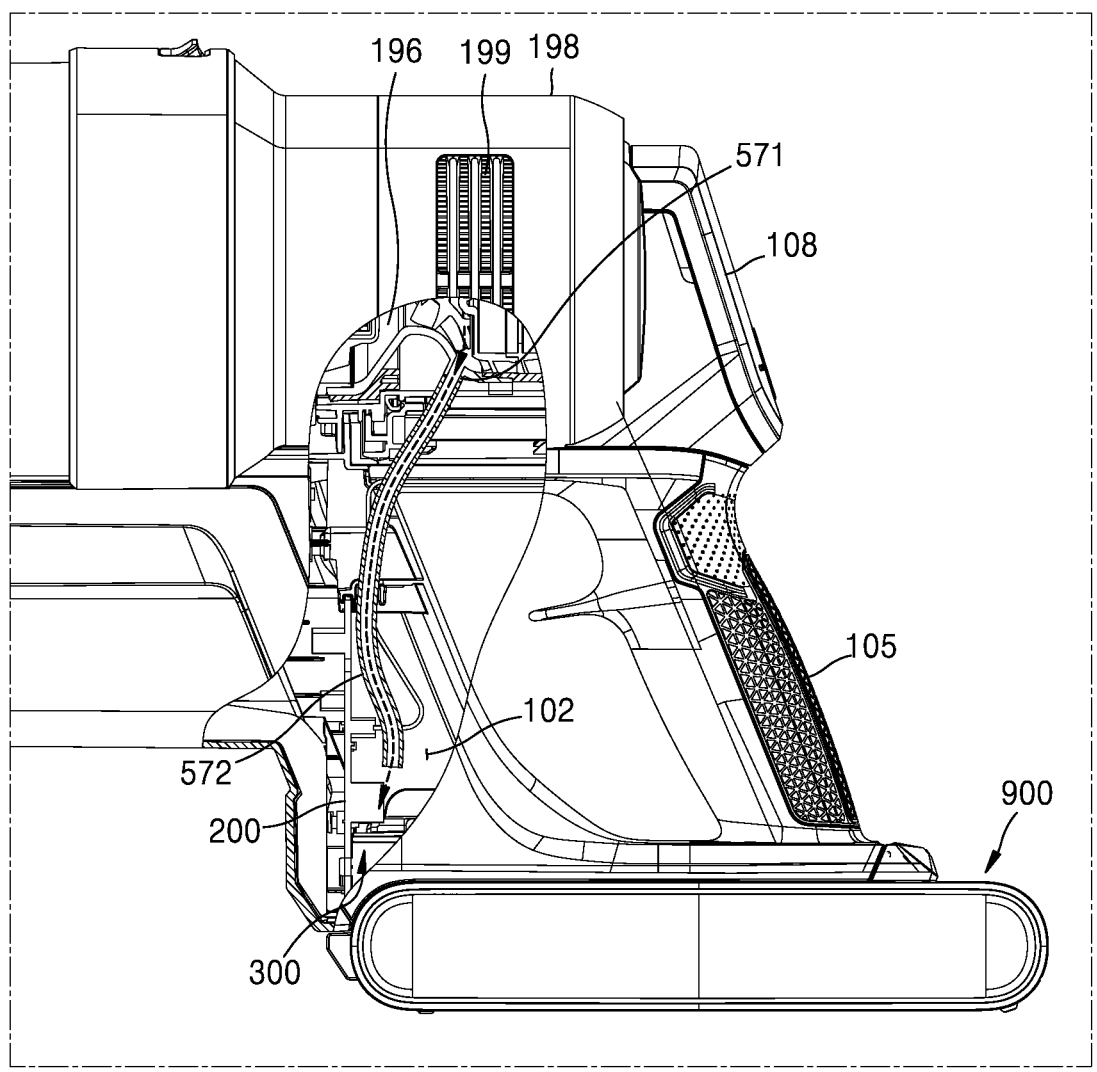
FIG. 16 is a schematic partial cross-sectional view of a cleaner according to an embodiment of the disclosure.

In an embodiment of the disclosure, exhaust air discharged through the exhaust passage 196 may be supplied into the board accommodating portion 102. FIG. 16 is a schematic partial cross-sectional view of a cleaner according to an embodiment of the disclosure. Referring to FIG. 16, the exhaust passage 196 is connected to the board accommodating portion 102. The PCB 200 and the first connector 300 may be disposed or placed inside the board accommodating portion 102.

For example, a second communication port 571 communicating with the board accommodating portion 102 may be provided in the exhaust passage 196. For example, the exhaust passage 196 may be connected to the board accommodating portion via a second cooling passage 572. One end of the second cooling passage 572 may branch off from the exhaust passage 196. In an embodiment, for example, the second cooling passage 572 may have one end connected to the second communication port 571 and the other end extending into the board accommodating portion 102. A portion of the exhaust air flowing through the exhaust passage 196 (hereinafter referred to as cooling air) is supplied into the board accommodating portion 102 through the second cooling passage 572. The cooling air absorbs heat from the PCB 200 having the heat dissipation structure 500. The cooling air is discharged outside of the main body 100 through the air holes 551 and 552. According to an embodiment having this configuration, because a portion of the exhaust air is used to cool the PCB 200, heat from the heat dissipation structure 500 of the PCB 200 and heat generated by the power system including the first terminal portion 320 may be effectively removed. Because the exhaust air is cleaned of foreign substances, a separate filter is not required to purify the cooling air diverged from the exhaust air.

The other end of the second cooling passage 572 may extend toward the PCB 200, e.g., to a location adjacent to the PCB 200. For example, the other end of the second cooling passage 572 may extend to a location adjacent to the heat dissipation structure 500. For example, the other end of the second cooling passage 572 may extend to a location adjacent to the first connector 300. A portion of the exhaust air (cooling air) drawn into the board accommodating portion 102 through the second cooling passage 572 is supplied to the vicinity of the PCB 200. The flux of the cooling air near the PCB 200 may be increased, thereby improving the heat dissipation effect. The second cooling passage 572 may be implemented by a flexible tubular member such as a tube, a hose, or the like. The second cooling passage 572 may also be formed integrally with the main body 100.

The above-described heat dissipation structures and structures for improving the heat dissipation effect may also be applied to the embodiment of the disclosure illustrated in FIG. 16.

The first terminal portion 320 of the first connector 300 is supported on the first connector housing 310. In an embodiment of the disclosure, a method of using the first connector housing 310 for heat dissipation may be considered. In such an embodiment, the first connector housing 310 may include or be formed of an insulating material with a high thermal conductivity. The first connector housing 310 may include or be formed of a polymer compound, oxide, nitride, or the like with a high thermal conductivity. For example, the first connector housing 310 may include or be formed of aluminum oxide ($Al_2O_3$), magnesium oxide (MgO), boron nitride (BN), or the like.

The second terminal portion 420 of the second connector 400 is supported on the second connector housing 410. In an embodiment of the disclosure, a method of using the second connector housing 410 for heat dissipation may be considered. In such an embodiment, the second connector housing 410 may be formed of an insulating material with a high thermal conductivity. The second connector housing 410 may include or be formed of a polymer compound, oxide, nitride, or the like with a high thermal conductivity. For example, the second connector housing 410 may include or be formed of $Al_2O_3$, MgO, BN, or the like.

Figure 17:
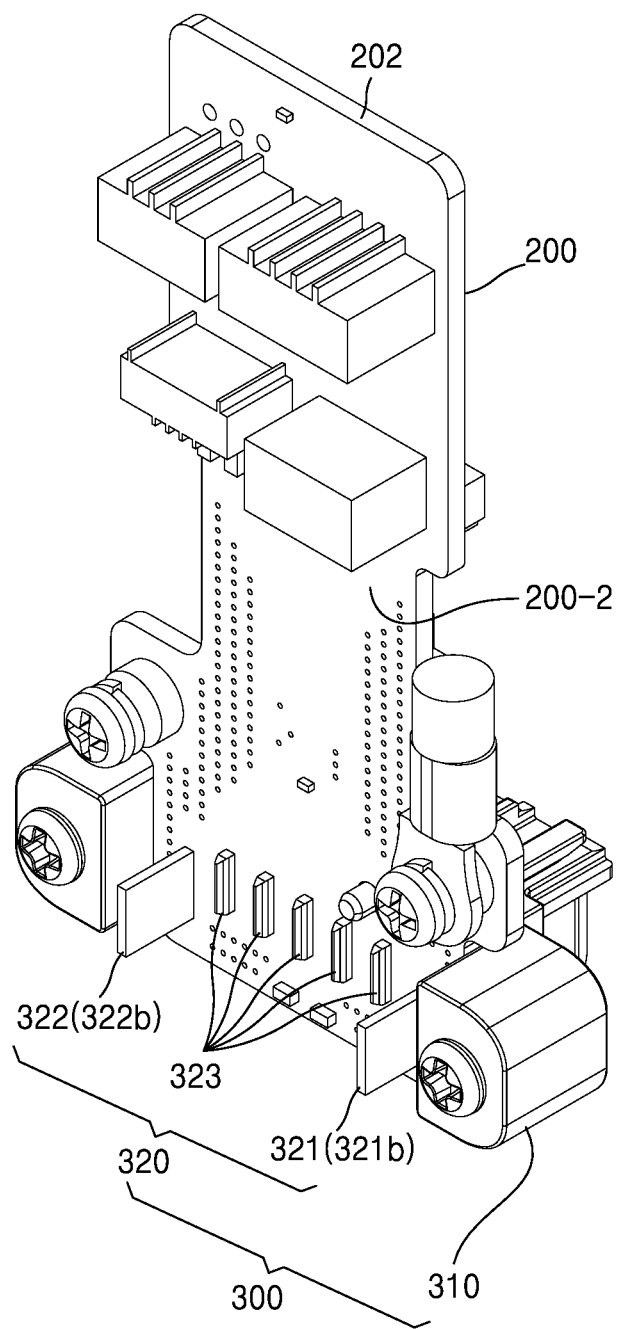
FIG. 17 is a schematic perspective view of a first connector according to an embodiment of the disclosure.

In an embodiment of the disclosure, heat dissipation using the first power terminals 321 and 322 of the first connector 300 may be considered. FIG. 17 is a schematic perspective view of the first connector 300 according to an embodiment of the disclosure. FIG. 17 illustrates the PCB 200 and the first connector 300. Referring to FIGS. 2 and 17, the first power terminals 321 and 322 may respectively include engaging portions (321a and 322a of FIG. 2) engaged with corresponding terminals of the second connector 400, e.g., the second power terminals 421 and 422, and protruding portions 321b and 322b respectively extending from the engaging portions 321a and 322a in the thickness direction of the PCB 200 and protruding outward from the PCB 200 by penetrating the PCB 200. For example, the engaging portions 321a and 322a protrude from the first side 200-1 of the PCB 200, and the protruding portions 321b and 322b penetrate the PCB 200 and protrude from the second side 200-2 of the PCB 200. The amount of protrusion of the protruding portions 321b and 322b from the second side 200-2 of the PCB 200 is greater than the amount of protrusion of the first control signal terminals 323 from the second side 200-2 of the PCB 200. The protruding portions 321b and 322b protrude into the board accommodating portion 102 and are exposed to the air inside the board accommodating portion 102, so that heat from the first power terminals 321 and 322 may be dissipated through the protruding portions 321b and 322b. Accordingly, the protruding portions 321b and 322b may contribute to suppression of an increase in temperature of the first power terminals 321 and 322. A heat dissipation effect achieved by the protruding portions 321b and 322b may be improved via a combination with the air holes 551 and 552. The heat dissipation effect achieved by the protruding portions 321b and 322b may be improved via a combination with structures that allow for communication between the intake passage 195 and/or exhaust passage 196 and the board accommodating portion 102.

The above-described heat dissipation structures and structures for improving the heat dissipation effect may also be applied to the embodiment of the disclosure illustrated in FIG. 17.

In an embodiment of the disclosure, a dummy terminal for heat dissipation may be provided on the PCB 200. Dummy terminals may be provided on the first side 200-1 or the second side 200-2, or both of the PCB 200. The number of dummy terminals is not specifically limited. The number of dummy terminals may be appropriately determined in consideration of the structure of the cleaner and the amount of heat generated.

Figure 18:
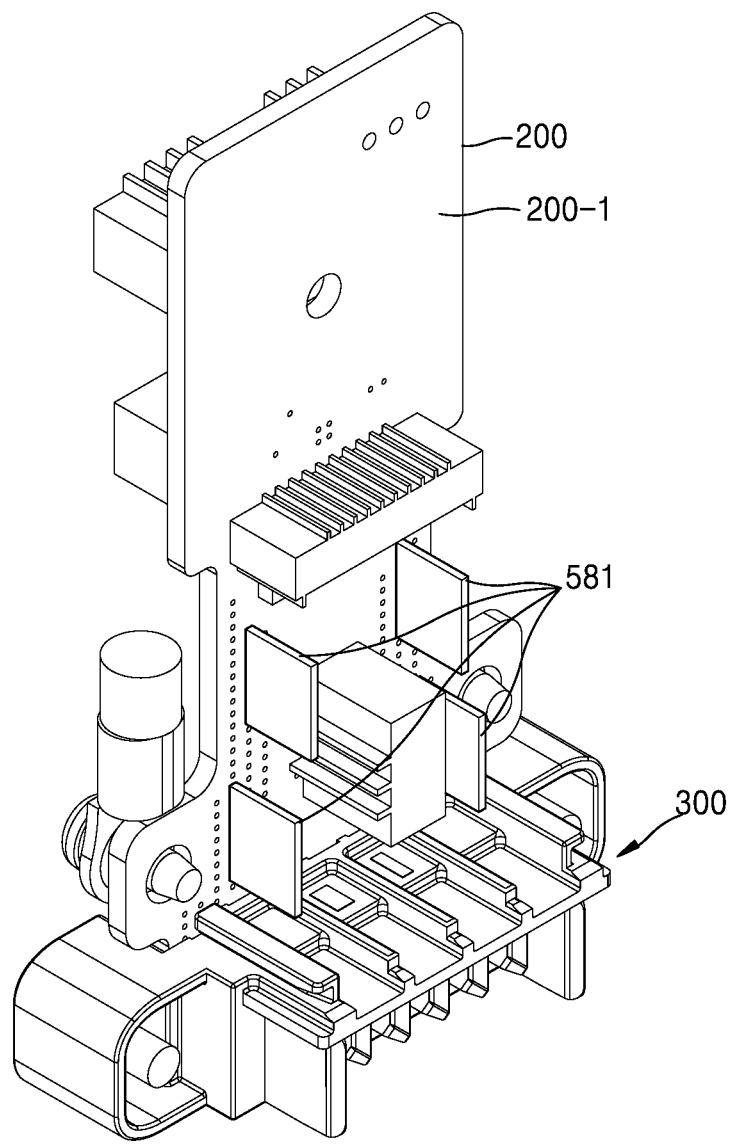
FIG. 18 is a schematic perspective view of a PCB according to an embodiment of the disclosure.
Figure 19:
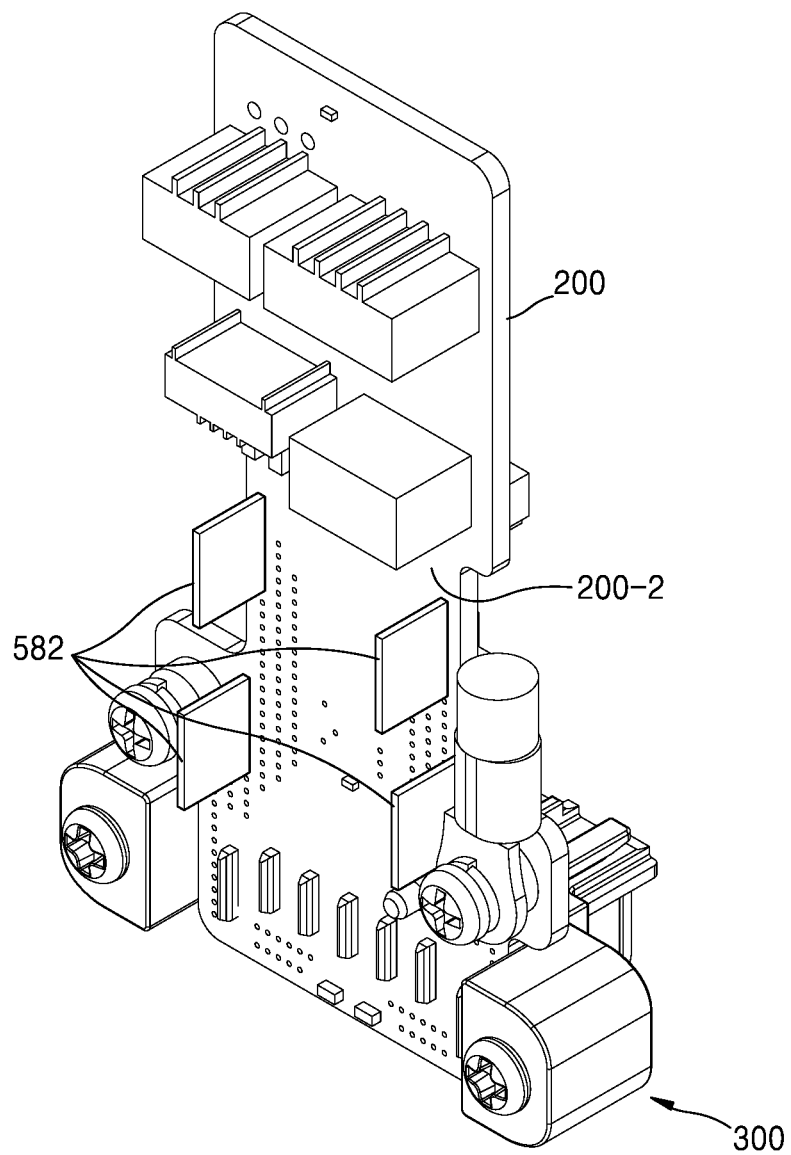
FIG. 19 is a schematic perspective view of a PCB according to an embodiment of the disclosure.

FIGS. 18 and 19 are schematic perspective views of the PCB 200 according to an embodiment of the disclosure. FIGS. 18 and 19 illustrate the PCB 200 and the first connector 300. Referring to FIG. 18, one or more dummy terminals 581 may be provided on the first side 200-1 of the PCB 200. The one or more dummy terminals 581 each protrude from the first side 200-1 of the PCB 200. The one or more dummy terminals 581 may be each formed of, for example, a material having a high thermal conductivity, such as a metal. The one or more dummy terminals 581 may be connected to the heat dissipation pad 520 of the heat dissipation structure 500. The one or more dummy terminals 581 may penetrate the PCB 200 and protrude from the second side 200-2 of the PCB 200. The one or more dummy terminals 581 protrude into the board accommodating portion 102 and are exposed to the air inside the board accommodating portion 102, and heat from the heat dissipation structure 500 provided on the PCB 200 and heat generated by the power system including the first terminal portion 320 may be dissipated through the one or more dummy terminals 581. Therefore, the one or more dummy terminals 581 may contribute to suppression of an increase in temperature of the first power terminals 321 and 322. A heat dissipation effect achieved by the one or more dummy terminals 581 may be improved via a combination with the air holes 551 and 552. The heat dissipation effect achieved by the one or more dummy terminals 581 may be improved via a combination with structures that allow for communication between the intake passage 195 and/or exhaust passage 196 and the board accommodating portion 102.

Referring to FIG. 19, one or more dummy terminals 582 may be provided on the second side 200-2 of the PCB 200. The one or more dummy terminals 582 each protrude from the second side 200-2 of the PCB 200. The one or more dummy terminals 582 may be each formed of, for example, a material having a high thermal conductivity, such as a metal. The one or more dummy terminals 582 may be connected to the heat dissipation pad 520 of the heat dissipation structure 500. The one or more dummy terminals 582 may penetrate the PCB 200 and protrude from the first side 200-1 of the PCB 200. The one or more dummy terminals 582 protrude into the board accommodating portion 102 and are exposed to the air inside the board accommodating portion 102, and heat generated in the heat dissipation structure on the PCB 200 and the power system including the first terminal portion 320 may be dissipated through the one or more dummy terminals 582.

Therefore, the one or more dummy terminals 582 may contribute to suppression of an increase in temperature of the first power terminals 321 and 322. A heat dissipation effect achieved by the one or more dummy terminals 582 may be improved via a combination with the air holes 551 and 552. The heat dissipation effect achieved by the one or more dummy terminals 582 may be improved via a combination with structures that allow for communication between the intake passage 195 and/or exhaust passage 196 and the board accommodating portion 102.

The above-described heat dissipation structures and structures for improving the heat dissipation effect may also be applied to the embodiment of the disclosure illustrated in FIGS. 18 and 19.

According to an embodiment of the disclosure, a cleaner includes: a main body including a board accommodating portion and a battery mounting portion; a PCB disposed in the board accommodating portion; a first connector provided on the PCB and including a first terminal portion, where the first terminal portion is exposed to the outside through the battery mounting portion; a battery which is detachable from the battery mounting portion; a second connector provided in the battery and including a second terminal portion coupled to the first terminal portion when the battery is mounted onto the battery mounting portion; and a heat dissipation structure provided on the PCB and configured to dissipate heat from the first terminal portion, where the heat dissipation structure includes a heat dissipation pad provided on the PCB and a plurality of heat dissipation patterns arranged two-dimensionally on the heat dissipation pad.

In an embodiment of the disclosure, the PCB may include a region where a control signal pattern is provided, and the heat dissipation pad may be provided on a region of a surface of the PCB 200, other than the region where the control signal pattern is formed.

In an embodiment of the disclosure, the first terminal portion may include a first power terminal, and the heat dissipation pad may be separated from the first power terminal.

In an embodiment of the disclosure, the first terminal portion may include a first power terminal, and the heat dissipation pad may be connected to the first power terminal.

In an embodiment of the disclosure, the first terminal portion may include a first power terminal, and the PCB may include a power connection portion connected to the first power terminal portion. In such an embodiment, the heat dissipation pad may be separated from a current path between the first power terminal and the power connection portion.

In an embodiment of the disclosure, the first terminal portion may include a first power terminal, and the PCB may include a power connection portion connected to the first power terminal portion. In such an embodiment, the heat dissipation pad may be connected to a current path between the first power terminal and the power connection portion.

In an embodiment of the disclosure, the PCB may include a first side and a second side opposite to the first side. In such an embodiment, the heat dissipation structure may include a first heat dissipation structure provided on the first side and a second heat dissipation structure provided on the second side.

In an embodiment of the disclosure, the first heat dissipation structure may be connected to the second heat dissipation structure by a plurality of thermally conductive through-holes passing through the PCB.

In an embodiment of the disclosure, the PCB may be a multilayer PCB. In such an embodiment, the heat dissipation pad may include a pair of surface heat dissipation pads located on a surface of the PCB and having the plurality of heat dissipation patterns formed thereon, and an interlayer heat dissipation pad between the pair of surface heat dissipation pads. In such an embodiment, at least two of the pair of surface heat dissipation pads and the interlayer heat dissipation pad may be thermally connected to each other.

In an embodiment of the disclosure, the first terminal portion may include a first power terminal and a first control signal terminal, and the first power terminal may be formed of a material having a higher thermal conductivity than the first control signal terminal.

In an embodiment of the disclosure, the first power terminal may be silver-plated.

In an embodiment of the disclosure, the first terminal portion may include a first power terminal and a first control signal terminal, and the first power terminal may be larger than the first control signal terminal.

In an embodiment of the disclosure, the battery mounting portion may be provided with an air hole defined therein, wherein an inside of the board accommodating portion communicates with an outside thereof via the air hole.

In an embodiment of the disclosure, the air hole may be located adjacent to the first connector.

In an embodiment of the disclosure, the main body may include an intake passage through which outside air is drawn in, and a first communication port, which communicates with the board accommodating portion, may be provided in the intake passage. In an embodiment of the disclosure, the cleaner may include a first cooling passage having one end connected to the first communication port and another end extending toward the PCB.

In an embodiment of the disclosure, the main body may include an exhaust passage through the air drawn therein is discharged, and the exhaust passage may be connected to the board accommodating portion. In an embodiment of the disclosure, the cleaner may include a second cooling passage having one end branching off from the exhaust passage and another end extending toward the PCB.

In an embodiment of the disclosure, the first terminal portion may include a first power terminal and a first control signal terminal. In such an embodiment, the first power terminal may include an engaging portion protruding from the first side of the PCB and engaged with the second terminal portion and a protruding portion extending from the engaging portion in a thickness direction of the PCB and penetrating the PCB to protrude more than the first control signal terminal from the second side of the PCB.

In an embodiment of the disclosure, the cleaner may include at least one dummy terminal protruding from at least one of the first side or the second side of the PCB.

Although reference has been made to embodiments of the disclosure illustrated in the drawings for understanding the disclosure, and specific terms have been used to describe the embodiments thereof, the scope of the disclosure is not limited by the specific terms, and the disclosure will be construed to encompass all embodiments that would normally occur to one of ordinary skill in the art.

Particular implementations described herein merely correspond to embodiments of the disclosure and do not limit the scope of the disclosure in any way. For the sake of brevity of the specification, conventional electronic configurations, control systems, software, and other functional aspects of the systems may be omitted. Furthermore, connecting lines or connectors shown in various figures are intended to represent exemplary functional connections and/or physical or circuit couplings between components in the figures, and in an actual device, connections between components may be represented by many alternative or additional functional relationships, physical connections, or logical connections. In addition, an element may not be necessarily essential to the practice of the disclosure unless the element is specifically described as "essential," "critical," etc. As used herein, the terms such as "comprising", "including", etc. are used to be understood as being an open-ended term for describing embodiments of the disclosure.

The use of the terms "the" and similar referents in the context of describing the disclosure (particularly in the context of the following claims) are to be construed to cover both the singular and the plural. Furthermore, recitation of ranges of values herein are merely intended to serve as a shorthand method of referring individually to each separate value falling within the range (unless otherwise indicated herein), and each separate value is incorporated into the specification as if it were individually recited herein. Lastly, operations of methods according to the disclosure described herein may be performed in any suitable order unless clearly specified herein or contradicted by context. The disclosure is not limited to the described order of the operations. The use of any and all examples or exemplary language, e.g., "such as", etc., provided herein is merely intended to describe the disclosure in detail and does not pose a limitation on the scope of the disclosure unless otherwise limited by the claims. Furthermore, various changes and modifications will be readily apparent to one of ordinary skill in the art without departing from the spirit and scope of the disclosure.

What is claimed is:

1. A cleaner comprising:
a main body including a board accommodating portion and a battery mounting portion;

a printed circuit board disposed in the board accommodating portion;
a first connector provided on the printed circuit board and including a first terminal portion, wherein the first terminal portion is exposed to the outside through the battery mounting portion;
a battery which is detachable from the battery mounting portion;
a second connector provided in the battery and including a second terminal portion coupled to the first terminal portion when the battery is mounted onto the battery mounting portion; and
a heat dissipation structure provided on the printed circuit board and configured to dissipate heat from the first terminal portion, wherein the heat dissipation structure includes a heat dissipation pad provided on the printed circuit board and a plurality of heat dissipation patterns arranged two-dimensionally on the heat dissipation pad.

2. The cleaner of claim 1, wherein
the printed circuit board includes a region where a control signal pattern is provided, and
the heat dissipation pad is provided on a region of a surface of the printed circuit board, other than the region where the control signal pattern is formed.

3. The cleaner of claim 1, wherein
the first terminal portion includes first power terminals, and
the heat dissipation pad is separated from the first power terminals.

4. The cleaner of claim 1, wherein
the first terminal portion includes first power terminals, and
the heat dissipation pad is connected to the first power terminals.

5. The cleaner of claim 1, wherein
the first terminal portion includes first power terminals,
the printed circuit board includes power connection portions connected to the first power terminal portion, and
the heat dissipation pad is separated from current paths between the first power terminals and the power connection portions.

6. The cleaner of claim 1, wherein
the first terminal portion includes first power terminals,
the printed circuit board includes power connection portions connected to the first power terminal portion, and
the heat dissipation pad is connected to current paths between the first power terminals and the power connection portions.

7. The cleaner of claim 1, wherein
the printed circuit board includes a first side and a second side opposite to the first side, and
the heat dissipation structure includes a first heat dissipation structure provided on the first side and a second heat dissipation structure provided on the second side.

8. The cleaner of claim 7, wherein the first heat dissipation structure is connected to the second heat dissipation structure by a plurality of thermally conductive through-holes defined through the printed circuit board.

9. The cleaner of claim 1, wherein
the printed circuit board is a multilayer printed circuit board,
the heat dissipation pad includes:
a pair of surface heat dissipation pads disposed on a surface of the printed circuit board and provided with the plurality of heat dissipation patterns defined thereon; and
interlayer heat dissipation pads disposed between the pair of surface heat dissipation pads, and
at least two selected from the pair of surface heat dissipation pads and the interlayer heat dissipation pads are thermally connected to each other.

10. The cleaner of claim 1, wherein
the first terminal portion includes first power terminals and first control signal terminals, and
each of the first power terminals includes a material having a higher thermal conductivity than the first control signal terminals.

11. The cleaner of claim 10, wherein the first power terminals are silver-plated.

12. The cleaner of claim 1, wherein
the first terminal portion includes first power terminals and first control signal terminals, and
each of the first power terminals is larger than each of the first control signal terminals.

13. The cleaner of claim 1, wherein the battery mounting portion is provided with air holes defined therein, wherein an inside of the board accommodating portion communicates with an outside thereof through the air holes.

14. The cleaner of claim 13, wherein the air holes are adjacent to the first connector.

15. The cleaner of claim 13, wherein
the main body includes an intake passage through which outside air is drawn in, and
a first communication port configured to communicate with the board accommodating portion is provided in the intake passage.

16. The cleaner of claim 15, comprising a first cooling passage with one end connected to the first communication port and another end extending toward the printed circuit board.

17. The cleaner of claim 13, wherein
the main body includes an exhaust passage through which air drawn therein is discharged, and
the exhaust passage is connected to the board accommodating portion.

18. The cleaner of claim 17, comprising a second cooling passage with one end branching off from the exhaust passage and another end extending toward the printed circuit board.

19. The cleaner of claim 1, wherein
the first terminal portion includes first power terminals and first control signal terminals, and
the first power terminals include:
engaging portions protruding from the first side of the printed circuit board and engaged with the second terminal portion; and
protruding portions respectively extending from the engaging portions in a thickness direction of the printed circuit board and penetrating the printed circuit board to protrude further than the first control signal terminals from the second side of the printed circuit board.

20. The cleaner of claim 1, comprising a dummy terminal protruding from at least one selected from the first side and the second side of the printed circuit board.

* * * * *